US012560150B2

(12) United States Patent
D'Amato et al.

(10) Patent No.: US 12,560,150 B2
(45) Date of Patent: Feb. 24, 2026

(54) SYSTEMS AND METHODS FOR CONTROLLING A WIND TURBINE

(71) Applicant: General Electric Renovables Espana, S.L., Barcelona (ES)

(72) Inventors: Fernando Javier D'Amato, Niskayuna, NY (US); Hema Kumari Achanta, Schenectady, NY (US); Masoud Abbaszadeh, Clifton Park, NY (US); Kalpesh Singal, Ballston Spa, NY (US); Mustafa Tekin Dokucu, Latham, NY (US); Xu Fu, Clifton Park, NY (US)

(73) Assignee: GE Vernova Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/699,019

(22) PCT Filed: Oct. 7, 2021

(86) PCT No.: PCT/US2021/053915
§ 371 (c)(1),
(2) Date: Apr. 5, 2024

(87) PCT Pub. No.: WO2023/059322
PCT Pub. Date: Apr. 13, 2023

(65) Prior Publication Data
US 2024/0401565 A1 Dec. 5, 2024

(51) Int. Cl.
*F03D 7/04* (2006.01)

(52) U.S. Cl.
CPC ............ *F03D 7/045* (2013.01); *F03D 7/046* (2013.01); *F05B 2260/821* (2013.01); *F05B 2260/84* (2013.01); *F05B 2270/404* (2013.01)

(58) Field of Classification Search
CPC .... F03D 7/045; F03D 7/046; F05B 2260/821; F05B 2260/84; F05B 2270/404
See application file for complete search history.

(56) References Cited

U.S. PATENT DOCUMENTS

| | | | |
|---|---|---|---|
| 4,455,614 A | 6/1984 | Martz et al. | |
| 7,062,370 B2 | 6/2006 | Vhora et al. | |
| (Continued) | | | |

FOREIGN PATENT DOCUMENTS

| | | | |
|---|---|---|---|
| CN | 102175449 B | 7/2012 | |
| CN | 109460621 A | 3/2019 | |
| (Continued) | | | |

OTHER PUBLICATIONS

PCT International Search Report Corresponding to PCT/US2021/053915 on Jul. 4, 2022.

(Continued)

*Primary Examiner* — Nathaniel E Wiehe
*Assistant Examiner* — Jason G Davis
(74) *Attorney, Agent, or Firm* — Dority & Manning, P.A.

(57) ABSTRACT

Systems and methods are provided for the control of a wind turbine. Accordingly, a wind classification module of a controller determines a current aerodynamic state of the wind resource based, at least in part, on a current operational data set of the wind turbine. The current operational data set is indicative of a current operation of the wind turbine. A configuration intelligence module of the controller then generates an estimated configuration for a turbine estimator module and a predictive control configuration for a predictive control module based, at least in part, on the current aerodynamic state. An operation of the wind turbine is emulated via the turbine estimator module to generate a control initial state for the predictive control module. The predictive control module then determines a predicted per- (Continued)

formance of the wind turbine over a predictive interval based on the control initial state and the predictive control configuration. The predictive control module generates a set point for at least one actuator of the wind turbine based on the predicted performance, and an operating state of the wind turbine is affected via the at least one actuator in accordance with the setpoint.

19 Claims, 9 Drawing Sheets

(56)                    References Cited

U.S. PATENT DOCUMENTS

| | | | |
|---|---|---|---|
| 7,225,343 B1 | 5/2007 | Honig et al. | |
| 7,805,205 B2 | 9/2010 | Santos | |
| 7,818,276 B2 | 10/2010 | Veillette et al. | |
| 8,191,136 B2 | 5/2012 | Dudfield et al. | |
| 8,219,356 B2 | 7/2012 | Mihok et al. | |
| 8,468,244 B2 | 6/2013 | Redlich et al. | |
| 8,756,047 B2 | 6/2014 | Patel | |
| 8,849,737 B1 | 9/2014 | Engler | |
| 8,973,123 B2 | 3/2015 | Bjones et al. | |
| 8,973,124 B2 | 3/2015 | Chong et al. | |
| 9,046,886 B2 | 6/2015 | Chong et al. | |
| 9,130,983 B2 | 9/2015 | Heo et al. | |
| 9,245,116 B2 | 1/2016 | Evans et al. | |
| 9,379,951 B2 | 6/2016 | Mihnev | |
| 9,384,885 B2 | 7/2016 | Karalis et al. | |
| 9,397,997 B2 | 7/2016 | Chong et al. | |
| 9,405,900 B2 | 8/2016 | Dixit et al. | |
| 9,483,049 B2 | 11/2016 | Maeda et al. | |
| 9,541,065 B2 | 1/2017 | Chauvin et al. | |
| 9,645,574 B2 | 5/2017 | Frankenstein et al. | |
| 9,712,553 B2 | 7/2017 | Nguyen et al. | |
| 9,719,494 B2 | 8/2017 | Prats Mustaros et al. | |
| 9,752,561 B2 | 9/2017 | Egedal et al. | |
| 9,784,241 B2 * | 10/2017 | Blom | F03D 7/045 |
| 9,822,762 B2 * | 11/2017 | Kooijman | F03D 7/0292 |
| 9,983,555 B2 | 5/2018 | Bengston | |
| 9,998,487 B2 | 6/2018 | Mestha et al. | |
| 10,267,291 B2 | 4/2019 | Hammerum et al. | |
| 10,302,067 B2 | 5/2019 | Herbsleb et al. | |
| 10,303,954 B2 | 5/2019 | Xiao et al. | |
| 10,337,497 B2 | 7/2019 | Hammerum et al. | |
| 10,344,740 B2 | 7/2019 | Caponetti et al. | |
| 10,387,728 B2 | 8/2019 | Arya et al. | |
| 10,417,415 B2 | 9/2019 | Abbaszadeh et al. | |
| 10,465,659 B2 | 11/2019 | Hammerum et al. | |
| 10,594,712 B2 | 3/2020 | Mestha et al. | |
| 10,678,912 B2 | 6/2020 | Mestha et al. | |
| 10,691,087 B2 | 6/2020 | D'Amato et al. | |
| 10,728,282 B2 | 7/2020 | Mestha et al. | |
| 10,749,890 B1 | 8/2020 | Aloisio et al. | |
| 10,954,919 B1 | 3/2021 | Evans et al. | |
| 10,975,845 B2 | 4/2021 | Grunnet et al. | |
| 11,053,918 B2 | 7/2021 | Hovgaard et al. | |
| 11,125,209 B2 | 9/2021 | Kjaer et al. | |
| 11,293,404 B2 | 4/2022 | Hovgaard et al. | |
| 11,384,730 B2 | 7/2022 | Dalsgaard et al. | |
| 11,421,652 B2 | 8/2022 | Thomsen et al. | |
| 11,429,713 B1 | 8/2022 | Donovan et al. | |
| 11,519,386 B2 | 12/2022 | Grunnet et al. | |
| 11,525,432 B2 | 12/2022 | Von Aswege | |
| 11,629,694 B2 * | 4/2023 | D'Amato | F03D 7/045 |
| | | | 700/287 |
| 2002/0032717 A1 | 3/2002 | Malan et al. | |
| 2006/0010493 A1 | 1/2006 | Piesco et al. | |
| 2007/0289013 A1 | 12/2007 | Lim | |
| 2008/0010225 A1 | 1/2008 | Gonsalves et al. | |
| 2008/0288330 A1 | 11/2008 | Hildebrand et al. | |
| 2011/0020122 A1 | 1/2011 | Parthasarathy et al. | |
| 2011/0148112 A1 | 6/2011 | Ormel et al. | |
| 2011/0272161 A1 | 11/2011 | Kumaran et al. | |
| 2012/0049516 A1 | 3/2012 | Viassolo | |

| | | |
|---|---|---|
| 2012/0209539 A1 | 8/2012 | Kim |
| 2013/0104236 A1 | 4/2013 | Ray et al. |
| 2013/0110414 A1 | 5/2013 | Caponetti et al. |
| 2013/0132149 A1 | 5/2013 | Wei et al. |
| 2013/0174664 A1 | 7/2013 | Olesen |
| 2013/0204664 A1 | 8/2013 | Romagnolo et al. |
| 2013/0214535 A1 | 8/2013 | Brath |
| 2013/0291115 A1 | 10/2013 | Chong et al. |
| 2013/0318022 A1 | 11/2013 | Yadav et al. |
| 2014/0003939 A1 | 1/2014 | Adams et al. |
| 2014/0103652 A1 | 4/2014 | Ubben et al. |
| 2014/0107521 A1 | 4/2014 | Galan |
| 2014/0201780 A1 | 7/2014 | Wong et al. |
| 2014/0244192 A1 | 8/2014 | Craig et al. |
| 2014/0283047 A1 | 9/2014 | Dixit et al. |
| 2014/0297635 A1 | 10/2014 | Orduna et al. |
| 2014/0298399 A1 | 10/2014 | Heo et al. |
| 2014/0337973 A1 | 11/2014 | Foster et al. |
| 2014/0359708 A1 | 12/2014 | Schwartz |
| 2015/0033341 A1 | 1/2015 | Schmidtler et al. |
| 2015/0095003 A1 | 4/2015 | Horowitz et al. |
| 2015/0118047 A1 | 4/2015 | Yoon et al. |
| 2015/0149174 A1 | 5/2015 | Gollan et al. |
| 2015/0249864 A1 | 9/2015 | Tang et al. |
| 2015/0346706 A1 | 12/2015 | Gendelman |
| 2015/0347902 A1 | 12/2015 | Butler, Jr. et al. |
| 2016/0033941 A1 | 2/2016 | T et al. |
| 2016/0127931 A1 | 5/2016 | Baxley et al. |
| 2016/0212100 A1 | 7/2016 | Banerjee |
| 2016/0222816 A1 | 8/2016 | Chen et al. |
| 2016/0252075 A1 | 9/2016 | Kruger et al. |
| 2016/0328654 A1 | 11/2016 | Bauer et al. |
| 2016/0333855 A1 | 11/2016 | Lund et al. |
| 2016/0341636 A1 | 11/2016 | Rajaram et al. |
| 2016/0369777 A1 | 12/2016 | Chiang et al. |
| 2017/0034205 A1 | 2/2017 | Canedo et al. |
| 2017/0052960 A1 | 2/2017 | Alizadeh-Shabdiz et al. |
| 2017/0054751 A1 | 2/2017 | Schneider et al. |
| 2017/0142133 A1 | 5/2017 | Kallos |
| 2017/0244726 A1 | 8/2017 | Finkel et al. |
| 2017/0284896 A1 | 10/2017 | Harpale et al. |
| 2017/0310690 A1 | 10/2017 | Mestha et al. |
| 2017/0346840 A1 | 11/2017 | Barkan |
| 2017/0350369 A1 | 12/2017 | Evans et al. |
| 2017/0352245 A1 | 12/2017 | Maher et al. |
| 2018/0100488 A1 | 4/2018 | Miranda et al. |
| 2018/0115561 A1 | 4/2018 | Sun et al. |
| 2018/0137277 A1 | 5/2018 | Mestha et al. |
| 2018/0142674 A1 | 5/2018 | Hammerum et al. |
| 2018/0157831 A1 | 6/2018 | Abbaszadeh et al. |
| 2018/0266392 A1 | 9/2018 | Hovgaard et al. |
| 2018/0268264 A1 | 9/2018 | Marwah et al. |
| 2018/0276375 A1 | 9/2018 | Arov et al. |
| 2018/0335018 A1 | 11/2018 | Cao et al. |
| 2018/0367550 A1 | 12/2018 | Musuvathi et al. |
| 2019/0128242 A1 | 5/2019 | Grunnet et al. |
| 2019/0154000 A1 | 5/2019 | Hammerum et al. |
| 2019/0190938 A1 | 6/2019 | Oba et al. |
| 2019/0230119 A1 | 7/2019 | Mestha et al. |
| 2019/0362070 A1 | 11/2019 | Abbaszadeh |
| 2020/0056588 A1 | 2/2020 | Nielsen |
| 2020/0244677 A1 | 7/2020 | Abbaszadeh et al. |
| 2020/0271093 A1 | 8/2020 | Grunnet et al. |
| 2020/0291922 A1 | 9/2020 | Hovgaard et al. |
| 2020/0318614 A1 | 10/2020 | Hovgaard et al. |
| 2020/0340450 A1 | 10/2020 | Grunnet et al. |
| 2021/0081270 A1 | 3/2021 | Abbaszadeh et al. |
| 2021/0295439 A1 | 9/2021 | Konrardy et al. |
| 2021/0372371 A1 | 12/2021 | Nielsen et al. |
| 2022/0046047 A1 | 2/2022 | Lewis |
| 2022/0213870 A1 | 7/2022 | De Bot |
| 2022/0334540 A1 | 10/2022 | D'Amato et al. |
| 2022/0345468 A1 | 10/2022 | Yan et al. |
| 2023/0077025 A1 | 3/2023 | Fu et al. |

FOREIGN PATENT DOCUMENTS

| | | |
|---|---|---|
| CN | 112261042 A | 1/2021 |
| DE | 102013208084 B3 | 5/2014 |

(56)       References Cited

FOREIGN PATENT DOCUMENTS

| EP | 3239884 A1 | 11/2017 |
| EP | 3436694 A1 | 2/2019 |
| EP | 3452877 A1 | 3/2019 |
| EP | 3465360 A1 | 4/2019 |
| EP | 3734063 A1 | 11/2020 |
| JP | 2018-178900 A | 11/2018 |
| KR | 20140109132 A | 9/2014 |
| WO | WO2014/144857 A2 | 9/2014 |
| WO | WO2015/092817 A1 | 6/2015 |
| WO | WO2016/020660 A1 | 2/2016 |
| WO | WO2016/139097 A1 | 9/2016 |
| WO | WO2016/172514 A1 | 10/2016 |
| WO | WO2016/176682 A1 | 11/2016 |
| WO | WO2019/052617 A1 | 3/2019 |
| WO | WO2019/110063 A1 | 6/2019 |
| WO | WO2019/114896 A1 | 6/2019 |
| WO | WO2019/120419 A1 | 6/2019 |
| WO | WO2019/214786 A1 | 11/2019 |
| WO | WO2020/078518 A1 | 4/2020 |
| WO | WO2021/066867 A1 | 4/2021 |

OTHER PUBLICATIONS

PCT International Search Report Corresponding to PCT/US2021/053915 on Apr. 18, 2024.

Almalawi et al., An Unsupervised Anomaly-Based Detection Approach for Integrity Attacks on SCADA Systems, ScienceDirect, Computers & Security, vol. 46, Oct. 2014, pp. 94-110. (Abstract Only) https://doi.org/10.1016/1.cose.2014.07.005.

Badihi et al., A Review on Application of Monitoring, Diagnosis, and Fault-tolerant Control to Wind Turbines, 2013 Conference on Control and Fault-Tolerant Systems (SysTol), Nice, France, Oct. 9-11, 2013, pp. 365-370.

Badihi et al., Model-Based Fault-Tolerant Pitch Control of an Offshore Wind Turbine, IFAC—Papersonline, vol. 51, Issue 18, 2018, pp. 221-226. (Abstract Only).

Cho et al., Model-based Fault Detection, Fault Isolation and Fault-tolerant Control of a Blade Pitch System in Floating Wind Turbines, Renewable Energy, vol. 120, May 2018, pp. 306-321.

Datta et al, Cyber Threat Analysis Framework for the Wind Energy Based Power System, CPS '17: Proceedings of the 2017 Workshop on Cyber-Physical Systems Security and Privacy, Nov. 2017, pp. 81-92. https://doi.org/10.1145/3140241.3140247.

El-Baklish et al., Nonlinear Model Predictive Pitch Control of Aero-Elastic Wind Turbine Blades, Renewable Energy, vol. 161, 2020, 777-791.

Feng et al., A Model-Based Predictive Control for FTC for Wind Turbine Speed Sensor Fault, 2013 Conference on Control and Fault-Tolerant Systems (SYSTOL), IEEE, XP032545765, Oct. 9, 2013, pp. 504-509. (Abstract Only).

Frison et al., BLASFEO: Basic Linear Algebra Subroutines for Embedded Optimization, ACM Transactions on Mathematical Software, vol. 44, No. 4, , 2017, 30 Pages. http://dx.doi.org/10.1145/3210754.

Frison et al., HPIPM: A High-Performance Quadratic Programming Framework for Model Predictive Control, IFAC—PapersOnLine, vol. 53, Issue 2, 2020, 6563-6569.

Frison et al., HPMPC—A New Software Package with Efficient Solvers for Model Predictive Control, 2015, 19 Pages. http://smart-cities-centre.org/wp-content/uploads/06-Frison-cities.pdf.

Frison et al., The BLAS API of BLASFEO Optimizing Performance for Small Matrices, ACM Transactions on Mathematical Software, vol. 46, Issue 2, Article No. 15, 1-36. (Abstract Only) https://doi.org/10.1145/3378671.

Gambier et al., Modeling the Aerodynamics of Wind Turbines for Real-Time Simulation and Control Purposes, IEEE 2017 11th Asian Control Conference (ASCC), 2017, 1432-1437.

Gao et al., On Cyber Attacks and Signature Based Intrusion Detection for Modbus Based Industrial Control Systems, Journal of Digital Forensics, Security and Law, vol. 9, No. 1, 2014, 20 Pages.

Jiang et al., Wind Turbine Fault Detection Using a Denoising Autoencoder with Temporal Information, IEEE, Journals & Magazines, IEEE/ASME Transactions on Mechatronics, vol. 23, Issue 1, Feb. 2018, pp. 89-100. (Abstract Only) https://doi.org/10.1109/TMECH.2017.2759301.

Kanev et al., Wind Turbine Extreme Gust Control, Wind Energy, vol. 13, 2010, 18-35.

Karimipour et al., Relaxation-based Anomaly Detection in Cyber-Physical Systems Using Ensemble KalmanFilter, ResearchGate, IET Cyber-Physical Systems Theory & Applications, vol. 5, Issue 1, 2020, p. 49-58. https://www.researchgate.net/deref/http%3A%2F%2Fdx.doi.org%2F10.1049%2Fiet-cps.2019.0031.

Kavaz et al., Fault Detection of Wind Turbine Sensors Using Artificial Neural Networks, Journal of Sensors, Dec. 19, 2018, 12 Pages.

Kerres et al., Economic Evaluation of Maintenance Strategies for Wind Turbines: A Stochastic Analysis, The Institution of Engineering and Technology (IET), Journals & Magazines, IET Renewable Power Generation, vol. 9, Issue 7, Sep. 2015, pp. 766-774. (Abstract Only) https://doi.org/10.1049/iet-rpg.2014.0260.

Knowles et al., A Survey of Cyber Security Management in Industrial Control Systems, International Journal of Critical Infrastructure Protection, vol. 9, 2015, pp. 52-80. http://dx.doi.org/10.1016/j.ijcip.2015.02.002.

Knudsen et al., A Nonlinear Model Predictive Control Scheme for Sensor Fault Tolerance in Observation Processes, International Journal of Robust and Nonlinear Control, vol. 30, Issue 14, 2020, 5657-5677. https://doi.org/10.1002/mc.5104.

Kosek et al., Ensemble Regression Model-based Anomaly Detection for Cyber-Physical Intrusion Detection in Smart Grids, 2016 IEEE Electrical Power and Energy Conference (EPEC), 2016, Ottawa, ON Canada. (Abstract Only) https://doi.org/10.1109/EPEC.2016.7771704.

Li et al., Data Driven Condition Monitoring of Wind Power Plants Using Cluster Analysis, IEEE, 2015 International Conference on Cyber-Enabled Distributed Computing and Knowledge Discovery, 2015, Xi'an China. (Abstract Only) https://doi.org/10.1109/CyberC.2015.16.

Li et al., Asset-Based Dynamic Impact Assessment of Cyberattacks for Risk Analysis in Industrial Control Systems, IEEE Transactions on Industrial Informatics, IEEE Service Center, vol. 14, No. 2, 2018, 608-618.

Lio et al., Kalman-Based Interacting Multiple-Model Wind Speed Estimator for Wind Turbines, Department of Wind Energy—Technical University of Denmark, 2021, 6 pages.

Lio et al., A Review on Applications of Model Predictive Control to Wind Turbines, In: Control (Control), 2014 UKACC International Conference on Control, 2014, 7 Pages.

Mahmoud et al., Adaptive and Predictive Control Strategies for Wind Turbine Systems: A Survey, IEEE CAA Journal of Automatica Sinica, vol. 6, No. 2, 2019, 364-378.

Mantere et al., Challenges of Machine Learning Based Monitoring for Industrial Control System Networks, Advanced Information Networking and Applications Workshops (WAINA), 2012 26th International Conference, Fukuoka, Mar. 26-29, 2012, pp. 968-972.

Mohammadpourfard et al., Identification of False Data Injection Attacks with Considering the Impact of Wind Generation and Topology Reconfigurations, IEEE, Journals & Magazines, IEEE Transactions on Sustainable Energy, vol. 9, Issue 3, Jul. 2018, pp. 1349-1364. (Abstract Only) https //doi.org/10.1109/TSTE.2017.2782090.

Mulders et al., Preventing Wind Turbine Tower Natural Frequency Excitation with a Quasi-LPV Model Predictive Control Scheme, Wind Energy, vol. 23, Issue 3, 2019, 627-644. https://doi.org/10.1002/we.2447.

Nalavade et al., Finding Frequent Itemsets using Apriori Algorihm to Detect Intrusions in Large Dataset, International Journal of Computer Applications & Information Technology, vol. 6, Issue 1, Jun.-Jul. 2014, pp. 84-92.

Nath, Low Latency Anomaly Detection with Imperfect Models, Dissertation University of Arkansas, May 2020, 24 pages.

(56) References Cited

OTHER PUBLICATIONS

Odgaard et al., A Benchmark Evaluation of Fault Tolerant Wind Turbine Control Concepts, IEEE Transactions on Control Systems Technology, vol. 23, Issue 3, 2015, 1221-1228. https://doi.org/10.1109/TCST.2014.2361291.

Odgaard et al., On Using Pareto Optimality to Tune a Linear Model Predictive Controller for Wind Turbines, Renewable Energy, vol. 87, 2016, 884-891.

Petrovic et al., MPC Framework for Constrained Wind Turbine Individual Pitch Control, Wind Energy, 2020, 1-15.

Qian et al., A Novel Wind Turbine Condition Monitoring Method Based on Cloud Computing, Science Direct, Renewable Energy, vol. 135, May 2019, pp. 390-398. (Abstract Only) https://doi.org/10.1016/j.renene.2018.12.045.

Qiao et al., A Survey on Wind Turbine Condition Monitoring and Fault Diagnosis—Part II: Signals and Signal Processing Methods, IEEE Transactions on Industrial Electronics, vol. 62, Issue 10, Oct. 2015, 6546-6557. https://doi.org/10.1109/TIE.2015.2422394.

Rasmussen et al., Application of Functional Modeling for Monitoring of WTG in a Cyber-Physical Environment, ResearchGate, IET Cyber-Physical Systems Theory & Applications, vol. 4, Jul. 2018, 9 Pages. https://www.researchgate.net/deref/http%3A%2F%2Fdx.doi.org%2F10.1049%2Fiet-cps.2017.0109.

Recalde et al., Gusts Detection in a Horizontal Wind Turbine by Monitoring of Innovations Error of an Extended Kalman Filter, Journal of Physics: Conference Series 753, 2016, 11 Pages.

Rezamand et al., A New Hybrid Fault Detection Method for Wind Turbine Blades Using Recursive PCA and Wavelet-Based PDF, IEEE, Journals & Magazines, Sensors Journal, vol. 20, Issue 4, Feb. 15, 2020, pp. 2023-2033. (Abstract Only) https://doi.org/10.1109/JSEN.2019.2948997.

Skormin et al., The Behavioral Approach to Diagnostics of Cyber-Physical Systems, AUTOTESTCON, 2014 IEEE, St. Louis, MO, Sep. 15-18, 2014, pp. 26-30.

Soliman et al., Multiple Model Multiple-Input Multiple-Output Predictive Control for Variable Speed Variable Pitch Wind Energy Conversion Systems, IET Renewable Power Generation, vol. 4, No. 2, 2011, 124-136.

Vanini et al., Fault Detection and Isolation of a Dual Spool Gas Turbine Engine Using Dynamic Neural Networks and Multiple Model Approach, ScienceDirect, vol. 259, Feb. 20, 2014, pp. 234-251. (Abstract Only) https://doi.org/10.1016/j.ins.2013.05.032.

Vencore Labs, Vencore Labs to Assist DARPA in Protecting The Nation's Electrical Grid, PR Newswire a Cision Company, Chantilly, VA, Sep. 13, 2016, 2 Pages. http://www.econline.com/doc/yencore-labs-to-assist-darpa-in-protecting-the-nation-s-electrical-grid-0001.

Wang, Unified Estimator for Offshore Wind Turbines—Prepare WTLin DataIn from Bladed Simulations, 2019, 12 pages.

Xu et al., Adaptive Fault Detection in Wind Turbine via RF and CUSUM, The Institution of Engineering and Technology (IET), Journals & Magazines, IET Renewable Power Generation, vol. 14, Issue 10, Jul. 27, 2020, pp. 1789-1796. (Abstract Only) https://doi.org/10.1049het-rpg 2019.0913.

Yampikulsakul et al., Condition Monitoring of Wind Power System with Nonparametric Regression Analysis, IEEE Transactions on Energy Conversion, vol. 29, Issue 2, Jun. 2014, pp. 288-299.

Yan et al., On Accurate and Reliable Anomaly Detection for Gas Turbine Combustors: A Deep Learning Approach, Annual Conference of the Prognostics and Health Management Society, 2015, pp. 1-8.

Yi et al., Discriminative Feature Learning for Blade Icing Fault Detection of Wind Turbine, IOP Science, Measurement Science and Technology, 115102, vol. 31, No. 11, Aug. 25, 2020. (Abstract Only) https://doi.org/10.1088/1361-6501/ab9bb8.

Yu, Unsupervised Machine Learning Anomaly Detection for Multivariate Time-Series Data in Wind Turbine Converters, Theseus, May 2020, 63 Pages.

Zhang et al., A Data-Driven Design for Fault Detection of Wind Turbines Using Random Forests and XGboost, IEEE, Journals & Magazines, vol. 6, 2018, pp. 21020-21031. https://doi.org/10.1109/ACCESS.2018.2818678.

Zhang et al., Fault Diagnosis Strategy for Wind Turbine Generator Based on the Gaussian Process Metamodel, Mathematical Problems in Engineering, vol. 2020, Article ID 4295093, 2020, 10 Pages. https://www.hindawi.com/journals/mpe/2020/4295093/.

* cited by examiner

WC= WIND CONDITION

WC= WIND CONDITION

SYSTEMS AND METHODS FOR CONTROLLING A WIND TURBINE

RELATED APPLICATION

The present application claims priority to PCT Application Serial Number PCT/US2021/053915, filed on Oct. 7, 2021, which is incorporated by reference herein.

FIELD

The present disclosure relates in general to electrical power generation, and more particularly to systems and methods for the control of a wind turbine via predictive controls.

BACKGROUND

Wind power is generally be considered one of the cleanest, most environmentally friendly energy sources presently available. To that end, wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple wind turbine generators that are operable to supply power to a transmission system providing power to a power grid.

Current wind turbine controls typically use generator torque and blade pitch actuators to maintain mechanical loads below design limits through a wide range of wind conditions and/or fault scenarios. In normal operation, the most basic control function is to regulate power and rotor speed according to prescribed schedules. These schedules generally depend on the wind speed affecting the wind turbine. At lower wind speeds, rotor speed may be regulated by torque while the blades may be oriented to capture the most wind power. At higher wind speeds, rotor speed may be regulated to its rated value by pitching the blades away from the wind. Additionally, the power may be regulated by generator torque.

In addition to the most basic control function, current wind turbine controls may include multiple functionalities, or control loops, that mitigate loads due to sudden wind gusts, increased wind shear, and/or faults in the system. These protection loops/schemes may consist of out-of-phase cyclic pitch, rapid pitching (such as a rapid pitch away from the wind to limit the load), and/or alternating pitching in and out of the wind. The real-time data required to regulate control loops/schemes and/or trigger protection loops may, for example, be obtained using estimation techniques (e.g., Kalman filters) based on simplified turbine models. The complexity of the simplified turbine models may be limited by computational limitations of known industrial control platforms.

The utilization of simplified models to obtain the data may, however, limit the ability of the controller to operate the wind turbine in an optimal manner. For example, the simplified models commonly employed in turbine estimation/control are simplistic and may not be able to provide accurate visibility into the state of the structure and/or the wind affecting the wind turbine. This may result in turbine control which is suboptimal due to being conservative. By way of additional example, many of the load mitigation schemes/loops are designed independently of one another with each loop/scheme sending pitch commands. As a result, the pitch system may experience unnecessary wear and be susceptible to instabilities caused by rate saturations. Also, the increasing number of protection loops/schemes may create complex dynamic interactions that may lead to tuning difficulties for the controller and, thus, suboptimal performance. Additionally, the protection loops/schemes may handle turbine constraints indirectly by choosing surrogate approximations that risk critical constraint violations or a conservative operation leading to suboptimal performance. By way of further example, the simplified models commonly employed may be ill-suited to model the increased dynamic coupling of the more flexible structures of modern wind turbines.

Thus, the art is continuously seeking new and improved systems and methods that address the aforementioned issues. As such, the present disclosure is directed to systems and methods controlling a wind turbine.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine. The method may include determining, via a wind classification module of the controller, a current aerodynamic state of a wind resource based, at least in part, on a current operational data set of the wind turbine indicative of a current operation of the wind turbine. A configuration intelligence module of the controller may be utilized to generate an estimator configuration for a turbine estimator module based, at least in part on the current aerodynamic state. The turbine estimator module of the controller may emulate an operation of the wind turbine so as to generate a control initial state for a predictive control module. The control initial state may include a modeled current operating state of a plurality of components of the wind turbine. The method may also include generating, via the configuration intelligence module, a predictive control configuration for the predictive control module based, at least in part, on the current aerodynamic state. The predictive control module may be employed to determine a predicted performance of the wind turbine over a predictive interval based on the control initial state and the predictive control configuration. The predictive control module may also be employed to generate a setpoint for at least one actuator of the wind turbine based on the predicted performance. Additionally, the method may include affecting an operating state of the wind turbine via the actuator(s) in accordance with the setpoint.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
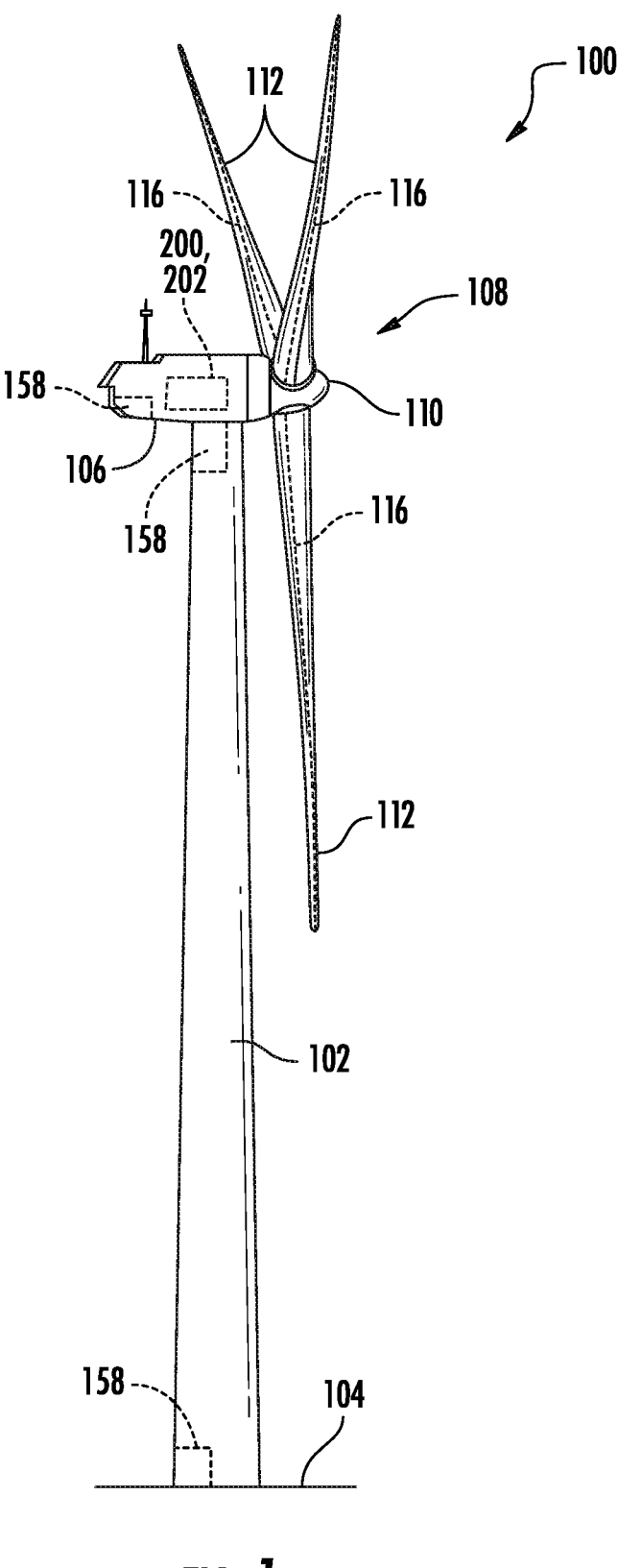
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine. In particular, the systems and methods disclosed herein may leverage the accuracy and numerical efficiency of online aeroelastic models (e.g., aeroelastic models executed in real time while the wind turbine is in operation) to provide detailed physical information concerning the wind turbine. The detailed physical information may be used online for estimation, controls, and/or fault management. This, in turn, facilitates the full utilization of aeroelastic predictive control to provide baseline core control functionality. Additionally, the systems and methods of the present application may employ multiple physics-based aeroelastic estimators in real time to determine aerodynamic states affecting the wind turbine and/or operating conditions (e.g. fault conditions) of the wind turbine. This determination may be further facilitated through the utilization of machine learning algorithms. The utilization of machine learning algorithms may be facilitated by the integration of advanced computing hardware and software (e.g., parallel calculations, which may be executed via a multi-core architecture) in an industrial control framework.

The advantages of the present systems and methods may be manifested in the utilization of a number of aeroelastic estimators to determine the current aerodynamic state and/or current operating condition of the wind turbine based on an operational data set (e.g., without environmental data), the tuning of a predictive control module, and the generation of at least one setpoint based on a predicted performance of the wind turbine. For example, a configuration intelligence module may select a gain tuning based, at least in part, on the current aerodynamic state and may generate an estimator configuration for a turbine estimator module and a predictive control configuration for a predictive control module. The turbine estimator module may emulate an operation of the wind turbine to generate a control initial state for the predictive control module. The predictive control module may then determine a predicted performance of the wind turbine over a predictive interval based on the control initial state and the predictive control configuration. The predictive control module may then generate a setpoint for at least one actuator of the wind turbine based on the predicted performance, and an operating state of wind turbine may be affected via the actuator(s) in accordance with the setpoint.

In other words, the effects of the wind on the wind turbine may be reflected in the operational response of the wind turbine. Therefore, aeroelastic models tuned to various presumptive wind conditions, such as nominal, turbulent, shear, veer, gust, etc., may be employed to determine the aerodynamic state of the wind that would result in the monitored operational response without necessitating the monitoring of the aerodynamic state directly. The aerodynamic state, which may include the current wind condition (e.g., nominal, turbulent, shear, gust, etc.) determined from the operational data set may then be utilized to select an appropriate gain tuning configured to facilitate an optimal response of the wind turbine in light of the determined current wind condition. The gain tuning may be reflected in the estimator configuration and the predictive control configuration. When tuned to the current wind condition, the turbine estimator module may emulate the current response of the wind turbine to the current wind conditions. This emulation may serve as a starting condition (e.g., control initial state) for the predictive control module. Being similarly tuned to the current wind condition, the predictive control module may predict how the operations of the wind turbine may vary from the starting condition over a future predictive interval. Based on this prediction of future performance, the predictive control module may generate a setpoint for the actuator (s) of the wind turbine. The setpoint may maintain the current operating state of the wind turbine or may seek to affect an operating state in order to optimize the wind turbine performance.

Referring now to the drawings, FIG. 1 illustrates a perspective view of one embodiment of a wind turbine 100 according to the present disclosure. The wind turbine 100 may generally include a tower 102 extending from a support surface 104 (e.g., ground), a nacelle 106, mounted on the tower 102, and a rotor 108 coupled to the nacelle 106. The rotor 108 may include a rotatable hub 110 and at least one rotor blade 112 coupled to, and extending outwardly from, the hub 110. For example, in the illustrated embodiment, the rotor 108 includes three rotor blades 112. However, in an additional embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 200. The controller 200 may, in an embodiment, be configured as a turbine controller 202 centralized within the nacelle 106. However, in other embodiments, the controller 200 may be located within any other component of the wind turbine 100 or at a location outside the wind turbine. Further, the turbine controller 202 may be communicatively coupled to any number of the components of the wind turbine 100 in order to control the components and/or a farm controller configured to control a plurality of wind turbines 100. As such, the controller 200 may include a computer or other suitable processing unit.

In an embodiment, the controller 200 may include suitable computer-readable instructions that, when implemented, configure the turbine controller 202 to perform various different functions, such as receiving, transmitting and/or executing wind turbine control/command signals. Additionally, the wind turbine 100 may include a plurality of actuators 160 (FIG. 2) that are configured to implement the various command signals (e.g., setpoints) and affect an operating state of the wind turbine 100. It should be appreciated that, as used herein, the "operating state" may refer to a physical configuration, orientation, and/or operating status of the wind turbine 100 or a component thereof.

Figure 2:
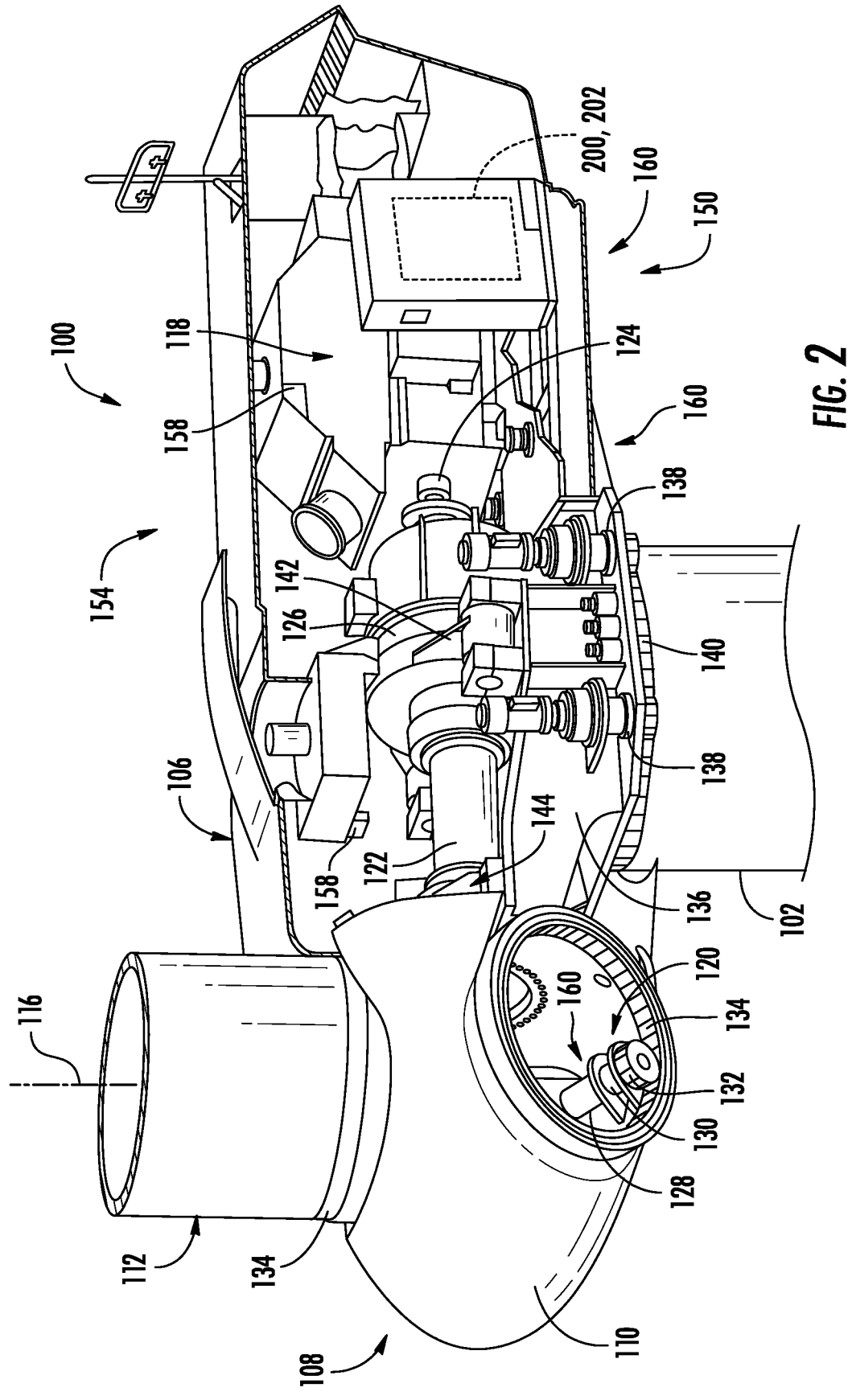
FIG. 2 illustrates a perspective, internal view of one embodiment of a nacelle of the wind turbine of FIG. 1 according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136. As is generally understood, the rotor shaft 122 may provide a low-speed, high-torque input to the gearbox 126 in response to rotation of the rotor blades 112 and the hub 110 when the wind turbine 100 is operating. The gearbox 126 may then be configured to convert the low-speed, high-torque input to a high-speed, low-torque output to drive the high-speed shaft 124 and, thus, the generator 118 during an operation of the wind turbine 100.

Each rotor blade 112 may also include a pitch control mechanism 120 configured to rotate each rotor blade 112 about its pitch axis 116. Each pitch control mechanism 120 may include a pitch drive motor 128, which may be considered to be an actuator 160), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128, such as in response to a setpoint, drives the pitch drive gearbox 130 and the pitch drive pinion 132, thereby rotating the pitch bearing 134 and the rotor blade(s) 112 about the pitch axis 116.

It should be appreciated that pitching the rotor blade(s) 112 about the pitch axis 116 may alter an angle of attack between the rotor blade(s) 112 and an apparent wind. Accordingly, the rotor blade(s) 112 may pitch to feather when the rotor blade(s) 112 rotates about the pitch axis 116 towards alignment with the apparent wind and to power when the rotor blade(s) 112 rotates towards an orientation generally perpendicular to the apparent wind. It should be further appreciated that pitching to feather generally depowers the rotor blade(s) 112 as a result of a reduction in the resultant lift. Therefore, the pitching the rotor blade(s) 112 about the pitch axis 116 in accordance with a setpoint may affect an operating state of the wind turbine 100.

Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100). It should be appreciated that the controller 200 may direct the yawing of the nacelle 106 and/or the pitching of the rotor blades 112 so as to aerodynamically orient the wind turbine 100 relative to a wind acting on the wind turbine 100, thereby facilitating power production.

Still referring to FIG. 2, the wind turbine 100 may include at least one sensor system 154, having one or more operational sensors 158 that can monitor an operation of the wind turbine 100. The operational sensor(s) 158 may be configured to detect a performance of the wind turbine 100, e.g. in response to the environmental condition. For example, the operational sensor(s) 158 may be a rotational speed sensor, a position sensor, an acceleration sensor, and/or an output sensor operably coupled to the controller 200.

In an embodiment, the operational sensor(s) 158 may be directed at, or integral with, any suitable component of the wind turbine 100. For example, the operational sensor(s) 158 may be directed at the rotor shaft 122 of the wind turbine 100 and/or the generator 118. The operational sensor(s) 158 may gather data indicative of the rotational speed and/or rotational position of the rotor shaft 122, or any other shaft of the wind turbine 100, and thus the rotor 108, or a pump, in the form of a rotor speed, a rotor azimuth, and/or any other suitable measurement. The operational sensor(s) 158 may, in an embodiment, be an analog tachometer, a D.C. tachometer, an A.C. tachometer, a digital tachometer, a contact tachometer a non-contact tachometer, or a time and frequency tachometer. In an embodiment, the operational sensor(s) 158 may, for example, be an encoder, such as an optical encoder.

In an embodiment, the operational sensor(s) 158 of the sensor system(s) 154 may be an ammeter, a voltmeter, an ohmmeter, and/or any other suitable sensor for monitoring an electrical condition of the wind turbine 100. Further, in an embodiment, the operational sensor(s) 158 may be a strain gauge, a proximity sensor, and/or any other suitable sensor configured to detect a displacement of the wind turbine 100 or a component thereof.

In an additional embodiment, the operating sensor(s) 158 of the sensor system(s) 154 may be a pitch sensor. As such, the controller 200 may receive a pitch indication for the rotor blade(s) 112 of the wind turbine 100 via the operating sensor(s) 158 operably coupled to the pitch control mechanism 120. The controller 200 may consider the pitch setpoint indication in light of the operations of the wind turbine 100 to determine whether the pitch of the rotor 108 is an operating state which may be changed to satisfy a required power production.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100 and/or a component thereof.

Referring now to FIGS. 3-9 multiple embodiments of a system 300 for controlling the wind turbine 100 according to the present disclosure are presented. As shown particularly in FIG. 3, a schematic diagram of one embodiment of suitable components that may be included within the system 300 is illustrated. For example, as shown, the system 300 may include a controller 200. The controller 200 may be configured to determine, from operational data, an aerodynamic state of a wind resource, tune a turbine estimator and a predictive control module based on the aerodynamic state, and determine a setpoint based on a predicted performance of the wind turbine. Additionally, the controller 200 may be configured to model projected operational responses of the wind turbine to a plurality of potential aerodynamic states of a wind resource affecting the wind turbine. As such, the controller 200 may be employed off-line and/or in real time (e.g., while the turbine is operating). Accordingly, in an embodiment, the controller 200 may be a single component located with the wind turbine 100. However, in an additional embodiment, the controller 200 may encompass more than one component located with wind turbine 100. In a further embodiment, the controller 200 may include additional components located at a distance from the wind turbine 100.

The controller 200 and/or the turbine controller 202 may be communicatively coupled to the sensor system(s) 154 and thus the operational sensor(s) 158. Further, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 158 to be converted into signals that can be understood and processed by the processors 206. It should be appreciated that the sensor(s) 158 may be communicatively coupled to the communications module 210 using any suitable means. For example, the sensor(s) 158 may be coupled to the sensor interface 212 via a wired connection. However, in other embodiments, the sensor(s) 158 may be coupled to the sensor interface 212 via a wireless connection, such as by using any suitable wireless communications protocol known in the art. Additionally, the communications module 210 may also be operably coupled to at least one actuator 160 configured to implement a control action as directed by a command signal (e.g., a control vector or setpoint).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200/turbine controller 202 to perform various functions in accordance with the methods disclosed herein, as well as various other suitable computer-implemented functions.

FIGS. 3-9 depict various aspects of a system 300 for controlling the wind turbine 100. Accordingly, in an embodiment, the controller 200 may be configured to implement process 400 to determine a current aerodynamic state 302 of a wind resource affecting the wind turbine 100. The current aerodynamic state 302 may, for example, be determined via a wind classification module 214 of the controller 200. The current aerodynamic state 302 may be based, at least in part, on a current operational data set 304. The current operational data set 304 may be indicative of a current operation 305 (e.g., a real time operation updated at 40 millisecond intervals) of the wind turbine 100 in response to the wind resource. The controller 200 may also utilize a configuration intelligence module 216 to determine an estimator configuration 306 for a turbine estimator module 218 of the controller 200 and a predictive control configuration 308 for a predictive control module 220 of the controller 200 based, at least in part, on the current aerodynamic state 302. As depicted at 309, the turbine estimator module 218 may emulate an operation of the wind turbine 100 to generate a control initial state 310 for the predictive control module 220. The control initial state 310 may include a modeled current operating state of a plurality of components of the wind turbine 100. The predictive control module 220 may then utilize at least the control initial state 310 and the predictive control configuration 308 to determine a predicted performance 312 of the wind turbine 100 over a predictive interval 314. The controller 200 may further utilize the predictive control module 220 to generate at least one setpoint 316 for at least one actuator 160 of the wind turbine 100 based on the predicted performance 312. Additionally, the system 300 may affect an operating state 318 of the wind turbine 100 via the actuator(s) 160 in accordance with the setpoint(s) 316.

In an embodiment, the wind classification module 214 may include a first plurality of aeroelastic estimators 320. As used herein, the term "aeroelastic estimator" may refer to an estimator that leverages the concept of "aeroelasticity" to estimate, model, emulate, simulate and/or otherwise determine the dynamic response of an elastic structure, or a component thereof, to a fluid. As illustrated by Collar's triangle, the "aeroelasticity" concept may reflect the coupling effects between inertial forces, elastic forces, and aerodynamic forces when an elastic body (e.g., the rotor blade(s) 112, the rotor 108, and/or the tower 102) is exposed to a fluid flow (e.g., the wind resource).

In an embodiment, an aeroelastic model 402 of an estimator leveraging the aeroelasticity concept may include an aerodynamic algorithm configured to determine aerodynamic loads developed in response to flow pattern of the wind against the elastic body. The aerodynamic loads may, for example, be modeled via various computational fluid dynamics approaches. The aeroelastic model 402 may also include a structural dynamic algorithm, such as a finite element model, configured to model a dynamic response of an elastic body based on the structural mechanics of the elastic body. The aerodynamic algorithm and the structural dynamic algorithm of the aeroelastic model 402 may thus be utilized in tandem to model the parameters of the fluid flow (e.g., an output) necessary to bring about an observed or projected behavior (e.g., an input) of the elastic body. In an additional embodiment, the aerodynamic algorithm and the structural dynamic algorithm of the aeroelastic model 402 may be utilized in tandem to model an expected behavior of the elastic body (e.g., an output) in response to an observed or projected fluid flow (e.g., an input). The aeroelastic model 402 may, for example, include at least one algorithm directed to a boundary element method, a Glauert correction factor, an induced velocities with dynamic inflow model, a blade deformation, quasi-static blade twist, and/or other suitable algorithms.

Figure 7:
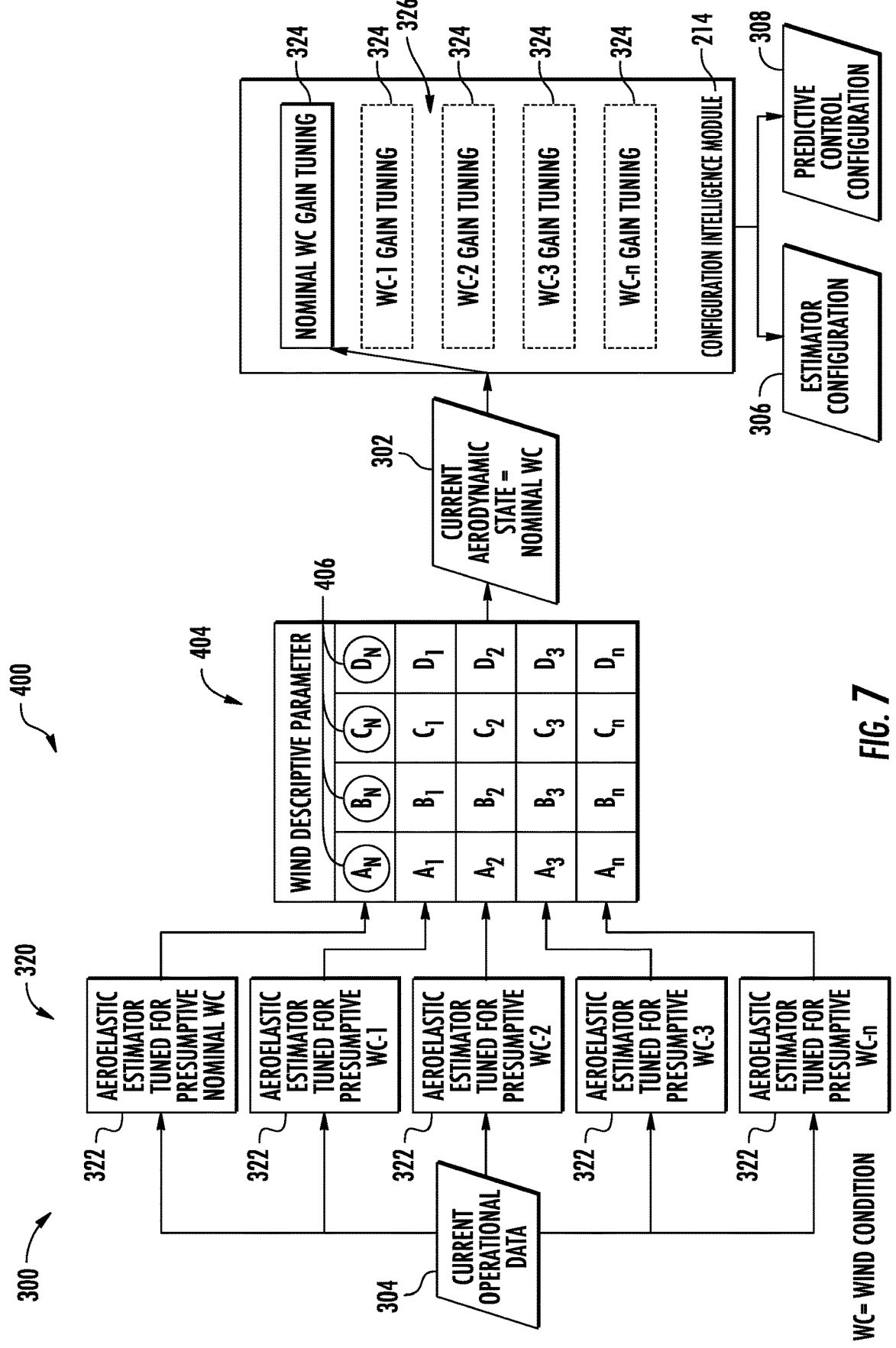
FIG. 7 illustrates a schematic of a portion of the control logic of FIG. 5 for controlling the wind turbine in the presence of a nominal wind condition according to the present disclosure.
Figure 8:
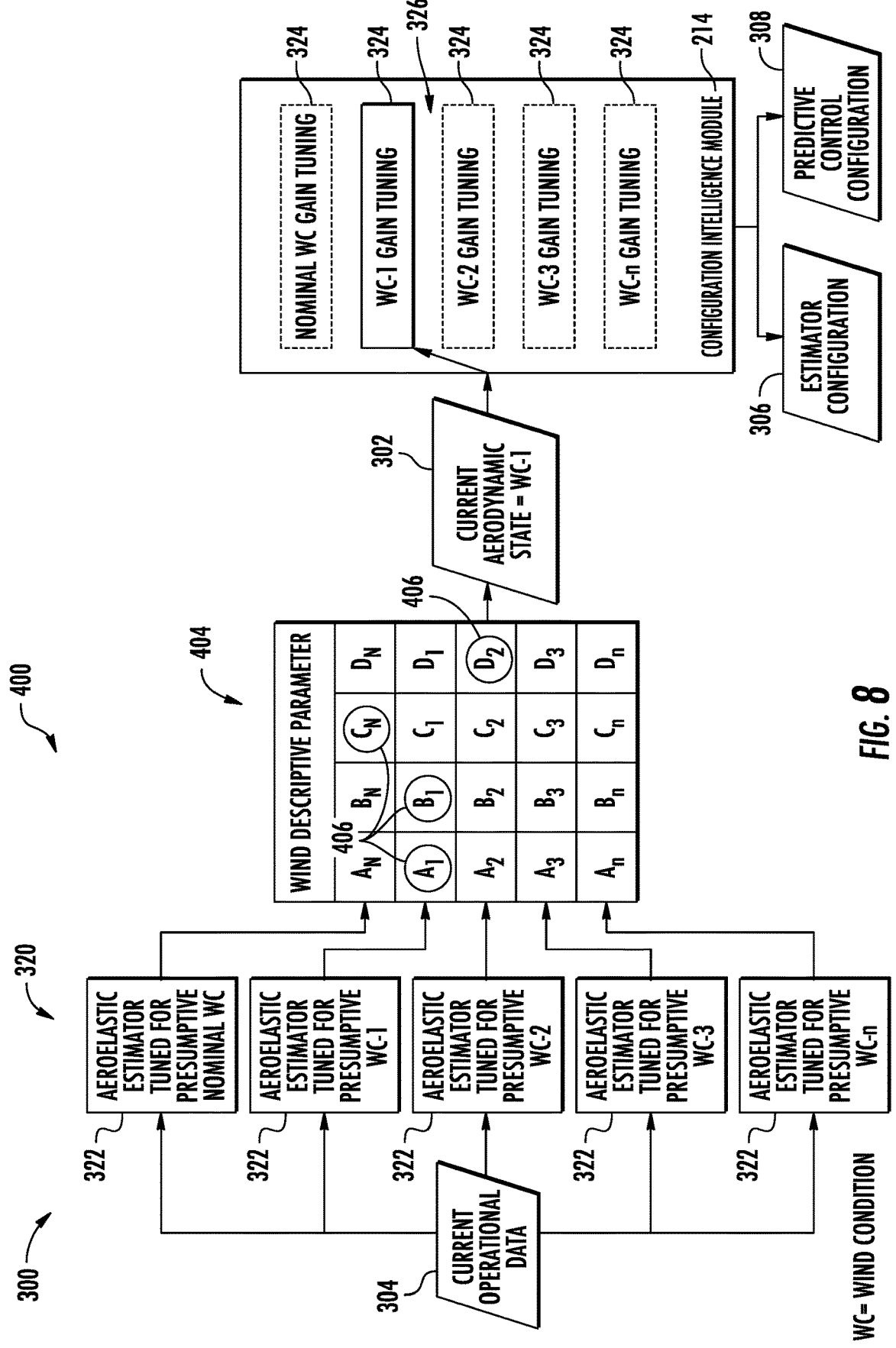
FIG. 8 illustrates a schematic of a portion of the control logic of FIG. 5 for controlling the wind turbine in the presence of a first wind condition according to the present disclosure.

As particularly depicted in FIGS. 7 and 8, in an embodiment, each aeroelastic estimator 322 of the plurality of aeroelastic estimators 320 may be tuned to a different presumptive wind condition (e.g., a nominal wind condition (WC), WC-1, WC-2, WC-3, . . . . WC-n). The different presumptive wind conditions may, for example, include a nominal wind condition, a gust condition (e.g., WC-1), a shear condition (e.g., WC-2), a veer condition (e.g., WC-3), a turbulence condition (e.g., WC-4), and/or other wind condition representing a deviation from the nominal wind condition which may affect an operation of the wind turbine 100. In other words, each aeroelastic estimator 322 may determine the parameters of the fluid flow (e.g., wind) that would result in the observed or projected operation of the wind turbine 100 if the fluid flow were experiencing the presumptive wind condition to which each aeroelastic estimator 322 is tuned.

By way of non-limiting illustration, one aeroelastic estimator 322 of the plurality of aeroelastic estimators 320 may presume that the wind impacting the wind turbine 100 has a shear condition and may model the inertial forces, elastic forces, and aerodynamic forces of the wind-wind turbine interaction under the presumed shear condition. It should be appreciated that the same computations may be accomplished in parallel (e.g., simultaneously) by each additional aeroelastic estimator 322 (e.g., via a multi-core architecture) of the plurality of aeroelastic estimators 320 for each additional presumptive wind condition. It should further be appreciated that for a given operation of the wind turbine, as reflected by the current operational data 304, the different presumptive wind conditions of each aeroelastic estimator 322 of the plurality of aeroelastic estimators 320 may result in a different output of the parameters of the fluid flow from each aeroelastic estimator 322.

In an embodiment, the wind classification module 214 may generate a plurality of wind descriptive parameters 404 from each aeroelastic estimator 322 based, at least in part, on the current operational data set 304. Therefore, each plurality of wind descriptive parameters 404 may be descriptive of characteristics of a wind impacting the wind turbine 100 that would result in the operational data set 304 if the wind were to demonstrate the presumptive wind condition to which the corresponding aeroelastic estimator 322 is tuned. Each of the pluralities of wind descriptive parameters 404 may, for example, include parameters corresponding to wind speed, vertical shear, horizontal shear, vertical misalignment, horizontal misalignment, turbulence, and/or any other parameter descriptive of the wind impacting the wind turbine 100.

The wind classification module 214 may, in an embodiment, determine the current aerodynamic state 302 from the pluralities of wind descriptive parameters 404 generated by the first plurality of aeroelastic estimators 320. It should be appreciated that, the wind classification module 214 may determine the current aerodynamic state 302 based on a designated portion 406 of the pluralities of wind descriptive parameters 404.

For example, in an embodiment, each aeroelastic estimator 322 of the first plurality of aeroelastic estimators 320 may include at least one aeroelastic model 402. In an additional embodiment, each aeroelastic estimator 322 of the first plurality of aeroelastic estimators 320 may include at least one filtering algorithm 408. The aeroelastic model(s) 402 of each aeroelastic estimator 322 may be configured to model a behavior of the wind turbine 100 as a multibody system of flexible structures. Accordingly, the aeroelastic model(s) 402 may be utilized to derive a resultant aerodynamic state 410 of the wind resource that develops the current operational data set 304 in the presence of the presumptive wind condition corresponding to the tuning of the aerodynamic model(s) 402. Accordingly, the wind classification module 214 may, at 411, determine the plurality of wind descriptive parameters 404 corresponding to the resultant aerodynamic state 410 derived by the aeroelastic model(s) 402 of each aeroelastic estimator 322 of the first plurality of aeroelastic estimators 320.

Figure 6:
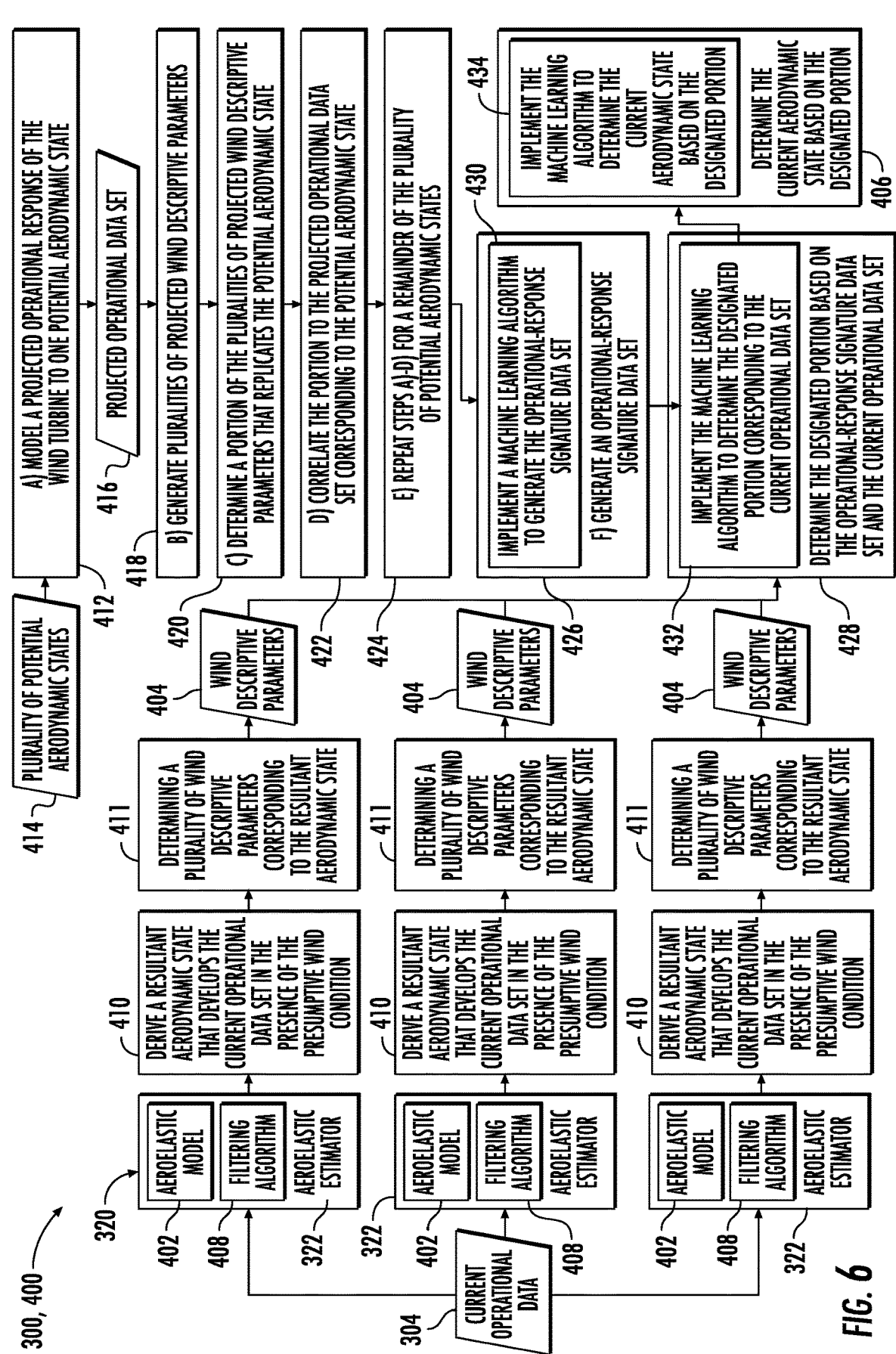
FIG. 6 illustrates a schematic of a portion of the control logic of FIG. 5 for controlling the wind turbine according to the present disclosure.

As particularly depicted at step (a) in FIG. 6, in order to determine the designated portion 406 of the pluralities of wind descriptive parameters 404, the controller 200 may model a projected operational response of the wind turbine 100 to one potential aerodynamic state 412 of a plurality of potential aerodynamic states 414 of the wind resource.

Based on the projected operational response, the controller 200 may generate a projected operational data set 416. The projected operational data set 416 may be descriptive of a projected operation of the wind turbine 100 should the one potential aerodynamic state 412 be encountered by the wind turbine 100.

It should be appreciated that the plurality of potential aerodynamic states 414 may correspond to an environmental operating envelope of the wind turbine 100. Accordingly, the one potential aerodynamic state 412 may be one wind condition falling within the environmental operating envelope of the wind turbine and, therefore, one wind condition that may be encountered by the wind turbine 100. A plurality of potential wind parameters may be utilized to describe the one potential aerodynamic state 412 of the plurality of potential aerodynamic states 414.

As illustrated at step (b), in an embodiment, each aeroelastic estimator 322 of the first plurality of aeroelastic estimators 320 may be utilized by the controller 200 to generate a plurality of projected wind descriptive parameters 418 based on the projected operational data set 416. It should be appreciated that for a given projected operational data set 416, the different presumptive wind conditions of each aeroelastic estimator 322 may result in a different output of the projected wind descriptive parameters 418.

As illustrated at step (c), in an embodiment, a portion 420 of the pluralities of projected wind descriptive parameters 418 that replicates the potential aerodynamic state of the plurality of potential aerodynamic states 414 may be determined. For example, the various individual projected wind descriptive parameters generated by the first plurality of aeroelastic estimators 320 based on the projected operational data set 416 may be compared to the plurality of potential wind parameters describing the one potential aerodynamic state 412 modeled by the controller at step (a). This comparison may reveal which of the various individual projected wind descriptive parameters of the pluralities of projected wind descriptive parameters 418 are descriptive of the one potential aerodynamic state.

As illustrated at 422, in an embodiment, step (d) may include correlating the portion of the pluralities of projected wind descriptive parameters 418 to the projected operational data set 416 that corresponds to the one potential aerodynamic state 412 of the plurality of potential aerodynamic states 414. In other words, the relationship between the specific portion of the pluralities of projected wind descriptive parameters 418 descriptive of the one potential aerodynamic state 412 and the projected operational data set 416 from which the pluralities of projected wind descriptive parameters 418 are generated may be established.

As illustrated at step (e), in an embodiment, step (a) through step (d) may be repeated for a remainder 424 of the plurality of potential aerodynamic states 414. It should be appreciated that repeating step (a) through step (d) may facilitate the determination of the correlation between the portions of the pluralities of projected wind descriptive parameters 418 and the projected operational data sets 416 corresponding to the various potential aerodynamic states 414 of the remainder 424. Therefore, the correlations may be determined across the environmental operating envelope of the wind turbine 100.

As illustrated at step (f), in an embodiment, the controller 200 may generate an operational-response signature data set 426. The operational-response signature data set 426 may include the projected operational data set 416 at each of the plurality of potential aerodynamic states 414 and the corresponding portion 420 of the pluralities of projected wind descriptive parameters 418. In other words, the combination of a particular projected operational data set 416 and a particular corresponding portion 420 of the pluralities of projected wind descriptive parameters 418 may indicate a particular aerodynamic state. Further, the operational-response signature data set 426 may facilitate the identification of a wind condition corresponding to one of the presumptive wind conditions (e.g., nominal WC, WC-1, WC-2, WC-3, . . . . WC-n) based on the particular corresponding portion 420 of the pluralities of projected wind descriptive parameters 418 generated by the first plurality of aeroelastic estimators 320 based on the particular projected operational data set 416. The operational-response signature data set 426 may be assembled by the controller 200 into a database, a lookup table and/or a graphical representation.

It should be appreciated that the operational-response signature data set 426 may facilitate a determination of the current aerodynamic state 302 (including a current wind condition, such as nominal, gust, shear, veer, turbulence, etc.) of the wind resource based on the pluralities of wind descriptive parameters 404 generated by the first plurality of aeroelastic estimators 320 based on the current operational data set 304. It should further be appreciated that steps (a)-(f) may, in an embodiment, be accomplished via the controller 200 off-line.

As depicted at 428, in operation, the wind classification module 214 may, in an embodiment, determine the designated portion 406 of the pluralities of wind descriptive parameters 404 based on the operational-response signature data set 426, the pluralities of wind descriptive parameters 404, and the current operational data set 304. In other words, the portion of the pluralities of wind descriptive parameters 404 that is indicative of the current aerodynamic state 302 may be identified/designated based on the relationship between the pluralities of wind descriptive parameters 404 and the current operational data set 304 as indicated by the operational-response signature data set 426.

In an embodiment, the wind classification module 214 may include at least one machine learning algorithm 430. As such, in order to determine the designated portion 406 of the pluralities of wind descriptive parameters 404 the controller 200 may implement the machine learning algorithm(s) 430 within the wind classification module 214 2 generate the operational-response signature data set 426. The machine learning algorithm(s) 430 may, for example utilize known machine learning models, such as Gaussian Process Models, Random Forest Models, Neural Network and/or Support Vector Machines. It should be appreciated that the machine learning algorithm(s) 430 may be trained offline/online via steps (a)-(f).

As depicted at 432, the machine learning algorithm(s) 430 may, in an embodiment, be implemented to determine the designated portion 406 of the pluralities of wind descriptive parameters 404 corresponding to the current operational data set 304. For example, in an embodiment, the machine learning algorithm(s) 430 may generate and/or leverage the operational-response signature data set 426 to determine the designated portion 406.

As depicted at 434, in an embodiment the machine learning algorithm(s) 430 may be implemented by the controller 200 to determine the current aerodynamic state 302 based on the designated portion 406 of the pluralities of wind descriptive parameters 404. For example, in an embodiment, the machine learning algorithm(s) 430 may generate and/or leverage the operational-response signature data set 426 to determine the designated portion 406 and may then determine the current aerodynamic state 302 based on the designated portion 406.

Figure 5:
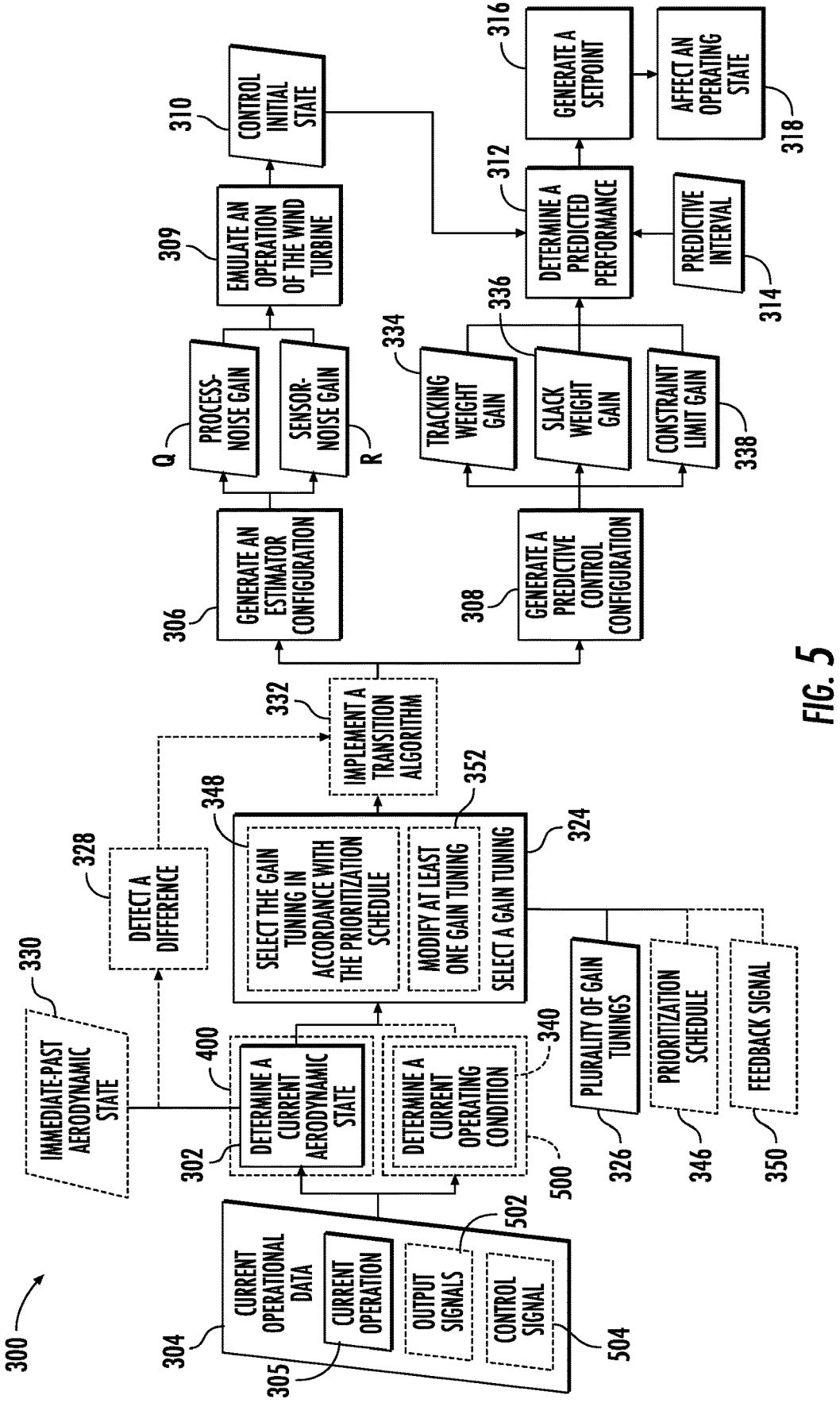
FIG. 5 illustrates a schematic of a control logic for controlling the wind turbine according to the present disclosure.

Referring in particular to FIGS. 5, 7, and 8, in an embodiment, the configuration intelligence module 216 may be utilized by the controller 200 to generate the estimator configuration 306 and the predictive control configuration 308. The estimator configuration may, for example, include at least a process-noise gain (Q) and a sensor-noise gain (R). The predictive control configuration may, for example, include at least gains corresponding to tracking weights 334, slack weights 336, and constraint limits 338.

Accordingly, in an embodiment, the configuration intelligence module 216 may select a gain tuning 324 of a plurality of gain tunings 326 based on the current aerodynamic state 302 in order to generate the estimator configuration 306 and the predictive control configuration 308. In such an embodiment, each gain tuning of the plurality of gain tunings 326 may be configured to modify the estimator configuration 306 and/or the predictive control configuration 308.

As depicted in FIGS. 7 and 8, each gain tuning of the plurality of gain tunings 326 may correspond to a desired performance/operational response of the wind turbine 100 when encountering a particular wind condition. For example, the plurality of gain tunings 326 may include gain tunings corresponding to each of the presumptive wind conditions (e.g., nominal WC, WC-1, WC-2, WC-3, . . . . WC-n) to which the plurality of aeroelastic estimators 320 may be tuned.

By way of illustration, FIG. 7 depicts an embodiment wherein the designated portion 406 of the pluralities of wind descriptive parameters 404 are indicative of a current aerodynamic state 302 that is consistent with a nominal wind condition of the wind resource impacting the wind turbine 100. As such, the configuration intelligence module 214 may select the gain tuning 324 configured as the nominal-WC gain tuning. In other words, in an embodiment wherein the wind classification module 214 determines that the wind resource impacting the wind turbine 100 has a nominal state, the configuration intelligence module 216 may select the gain tuning 324 that optimizes the performance of the wind turbine 100 for the nominal wind conditions.

By way of additional illustration, FIG. 8 depicts an embodiment wherein the designated portion 406 of the pluralities of wind descriptive parameters 404 are indicative of a current aerodynamic state 302 that is consistent with a first wind condition (WC-1) (e.g., any of gust, shear, veer, turbulence, etc.). As such, the configuration intelligence module 214 may select the gain tuning 324 configured as the WC-1 gain tuning. In other words, in an embodiment wherein the wind classification module 214 determines that the wind resource impacting the wind turbine 100 has a first wind condition, the configuration intelligence module 216 may select the gain tuning 324 that optimizes the performance of the wind turbine 100 for the determined current aerodynamic state 302.

It should be appreciated that the configuration intelligence module 216 may switch between the gain tunings of the plurality of gain tunings 326 in response to changes in the determination of the current aerodynamic state 302 by the wind classification module 214. For example, in an embodiment, the configuration intelligence module 216 may detect a difference 328 between the current aerodynamic state 302 and an immediate-past aerodynamic state 330. The difference 328 may necessitate a gain transition between the various gain tunings of the plurality of gain tunings 326.

In an embodiment wherein a gain transition may be required, the configuration intelligence module 216 may implement a transition algorithm 332. The transition algorithm 332 may correspond to the current aerodynamic state 302. In other words, the transition algorithm 332 may be tailored to the current aerodynamic state 302. For example, the transition algorithm 332 may implement fast blending of the gain transition for sudden events/wind conditions, such as gusts. However, the transition algorithm 332 may implement slow blending for events/wind conditions such as shear or veer. The transition algorithm 332 may thus, in an embodiment, facilitate a smooth transition between an immediate-past gain tuning and the selected gain tuning 324 that corresponds to the current aerodynamic state 302.

Figure 4:
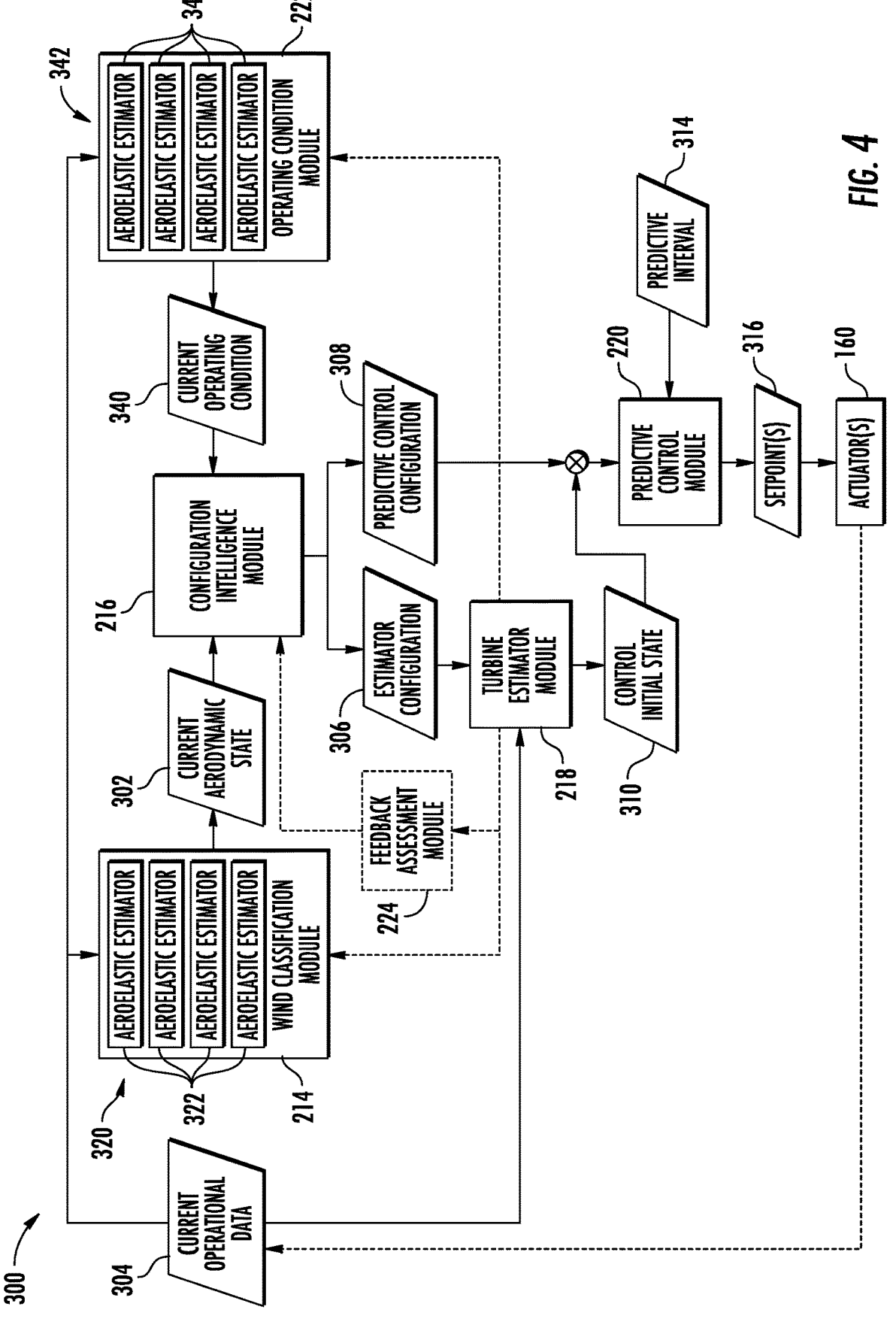
FIG. 4 illustrates a schematic of a system for controlling the wind turbine according to the present disclosure.
Figure 9:
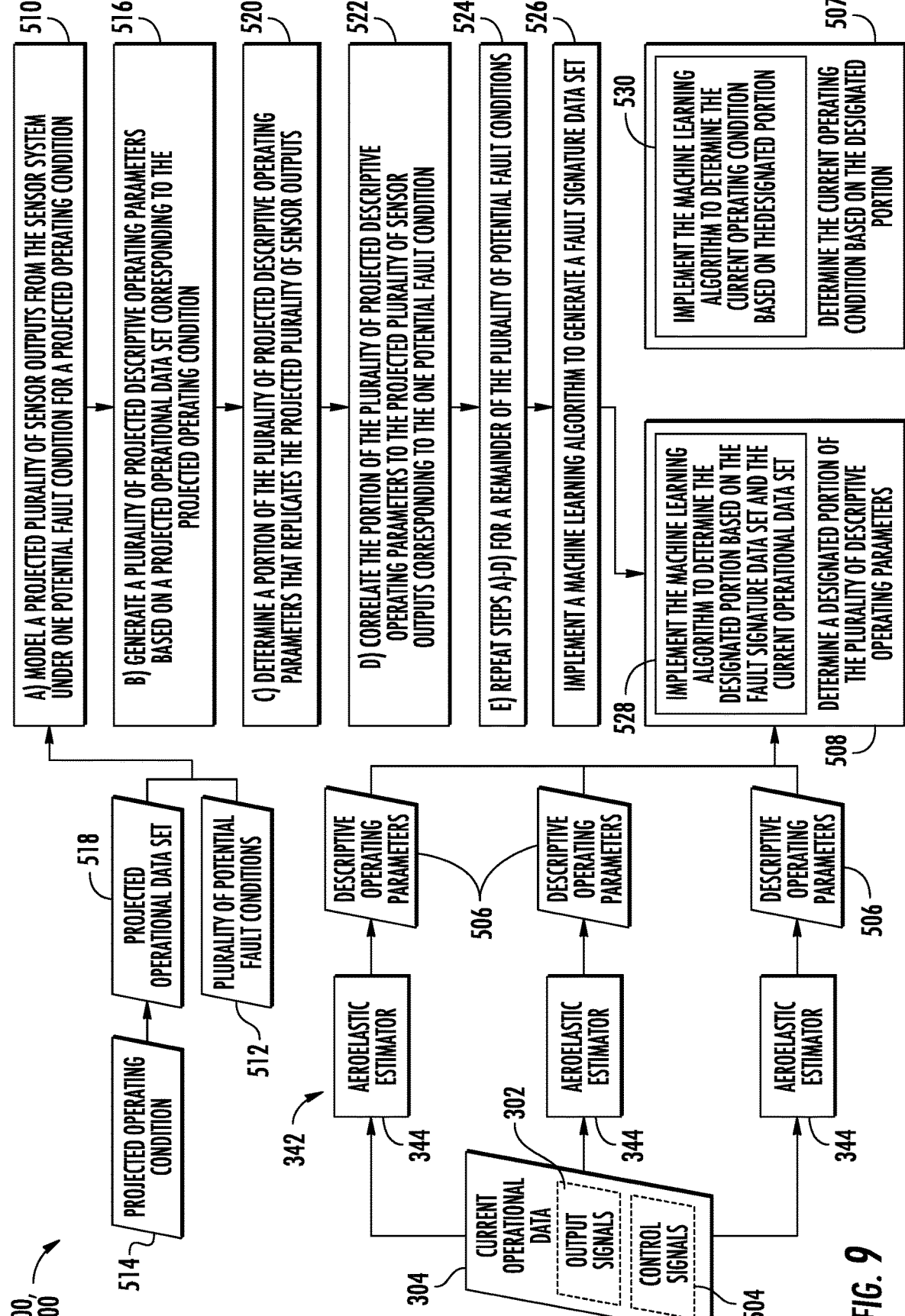
FIG. 9 illustrates a schematic of a portion of the control logic of FIG. 5 for controlling the wind turbine according to the present disclosure.

Referring, in particular, to FIGS. 4, 5, and 9, in order to generate the estimator configuration 306 and the predictive control configuration 308, the controller 200 may also utilize an operating condition module 222 in an embodiment. The operating condition module 222 may determine a current operating condition 340 of the wind turbine 100. The current operating condition 340 may, for example, indicate that the current operation 305 of the wind turbine 100 is consistent with a nominal operation of the wind turbine 100. However, in an additional embodiment, the current operating condition 340 may indicate that current operation 305 is degraded relative to the nominal operation of the wind turbine 100. In a further embodiment, the current operating condition 340 may indicate the presence of a fault condition affecting a component and/or sensor signal of the wind turbine 100.

The determination of the current operating condition 340 may be achieved via the implementation of process 500 by the operating condition module 222. In an embodiment, the current operating condition 340 may be determined based, at least in part, on the current operational data set 304. In such an embodiment, the current operational data set 304 may include a plurality of output signals 502 from the sensor system 154(s) of the wind turbine 100. Additionally, the current operational data set 304 may, in an embodiment, include at least one control signal 504 from the controller 200.

In an embodiment wherein the system 300 employs the operating condition module 222, the configuration intelligence module 216 may generate the estimator configuration 306 for the turbine estimator module 218 based, at least in part, on the current aerodynamic state 302 and the current operating condition 340. In an additional embodiment, the configuration intelligence module 216 may generate the predictive control configuration 308 for the predictive control module 220 based, at least in part, on the current aerodynamic state 302 and the current operating condition 340.

In an embodiment, the operating condition module 222 may include a second plurality of aeroelastic estimators 342. Each aeroelastic estimator 344 of the second plurality of aeroelastic estimators 342 may be tuned to a different presumptive fault/anomaly condition of the wind turbine 100. In other words, each aeroelastic estimator 344 of the second plurality of aeroelastic estimators 342 may presume that the current operational data 304 includes output signals 502 and/or control signals 504 that are the result of the presumptive fault condition to which the particular aeroelastic estimator 344 is tuned.

For example, in an embodiment, at least one aeroelastic estimator 344 may be tuned to describe the operations of the wind turbine 100 based on the presumption that the wind turbine 100 is experiencing a blade pitch anomaly. The blade pitch anomaly may include a pitch system condition, such as a frozen pitch angle, a sluggish actuator response, excessive bearing friction, and/or other similar conditions that may impact the ability of the pitch system to orient the rotor blade 112 at a desired pitch angle.

In an additional embodiment, at least one aeroelastic estimator 344 may be tuned to describe the operations of the wind turbine 100 based on the presumption that the wind turbine 100 is experiencing a sensor anomaly. The sensor anomaly may include biases, excessive noise, and/or failures of the sensor system 154 and/or the operational sensor(s) 158. For example, a sensor fault may be indicated by an absence of a signal from one or more sensors and/or a poor signal quality/resolution. In an additional embodiment, a sensor fault may be indicated by the sensor output being out-of-range and/or lacking an azimuth signal. Additional sensor faults may include, but are not limited to, a zero-calibration-low fault, a strain sensor drift, a temperature sensor failure, and additive fault, a multiplicative fault, an output stuck fault and/or a slow drifting fault.

In a further embodiment, at least one aeroelastic estimator 344 may be tuned to describe the operations of the wind turbine 100 based on the presumption that the wind turbine 100 is experiencing degraded/sub-optimal performance. Such degradation may, for example, be attributed to ice formation, pitch angle offsets, a blade imbalance, a degraded airfoil, a wake effect, a wind shadow, and/or other condition which may result in the operation of the wind turbine 100 deviating from a nominal operation. It should be appreciated that individual aeroelastic estimators of the second plurality of aeroelastic estimators 342 may be tuned to presume the presence of different sources of the degradation.

In an embodiment, the operating condition module 222 may generate a plurality of descriptive operating parameters 506 from the second plurality of aeroelastic estimators 342. The generation of the plurality of descriptive operating parameters 506 may be based, at least in part, on the current operational data set 304. As depicted at 507, in an embodiment, the operating condition module 222 may then determine the current operating condition 340 of the wind turbine 100 based on a designated portion 508 of the plurality of descriptive operating parameters 506.

As particularly depicted in FIG. 9, in order to determine the designated portion 508 of the plurality of descriptive operating parameters 506, the controller 200 may model a projected plurality of sensor outputs 510 from the sensor system 154. The projected plurality of sensor outputs 510 may be modeled under one potential fault condition of a plurality of potential fault conditions 512 for a projected operating condition 514. The second plurality of aeroelastic estimators 342 may then be utilized to generate a plurality of projected descriptive operating parameters 516 based on a projected operational data set 518 corresponding to the projected operating condition 514. As depicted at 520, a portion of the plurality of projected descriptive operating parameters 516 that replicates the projected plurality of sensor outputs 510 may be determined. As depicted at 522, the portion of the plurality of projected descriptive operating parameters 516 may be correlated to the projected plurality of sensor outputs corresponding to the one potential fault condition of the plurality of potential fault conditions 512. As depicted at 524, the steps may be repeated for a remainder of the plurality of potential fault conditions 512.

In an embodiment, the operating condition module 222 may implement at least one machine learning algorithm to generate a fault signature data set 526. The fault signature data set may include the projected plurality of sensor outputs 510 at each potential fault condition of the plurality of potential fault conditions 512 and the corresponding portion of the plurality of projected descriptive operating parameters 516. As depicted at 528, in an embodiment, the machine learning algorithm(s) may then be implemented to determine the designated portion 508 of the plurality of descriptive operating parameters 506 based on the fault signature data set 526 and the current operational data set 304. It should be appreciated that, as depicted at 530, the machine learning algorithm(s) may also be implemented to determine the current operating condition 340 based on the designated portion 508 of the plurality of descriptive operating parameters 506.

In an embodiment wherein the system 300 employs the operating condition module 222, the configuration intelligence module 216 may select the gain tuning 324 based on the current aerodynamic state 302 and the current operating condition 340. In such an embodiment, each gain tuning 324 may be configured to modify at least one of the estimator configuration 306 and the predictive control configuration 308 based on the current aerodynamic state 302 of the wind resource and the current operating condition 340 of the wind turbine 100.

In order to select the gain tuning 324 of the plurality of gain tunings 326, in an embodiment, a prioritization schedule 346 may be determined for the plurality of gain tunings 326. Accordingly, as depicted at 348, the configuration intelligence module 216 may select the gain tuning 324 in accordance with the prioritization schedule 346 based on the current aerodynamic state 302 and the current operating condition 340. For example, in an embodiment, the prioritization schedule 346 may prioritize a gain tuning 326 associated with a curtailed operation in response to a particular fault/anomaly over a gain tuning 326 configured to optimize the performance of the wind turbine when encountering a particular wind condition.

Figure 3:
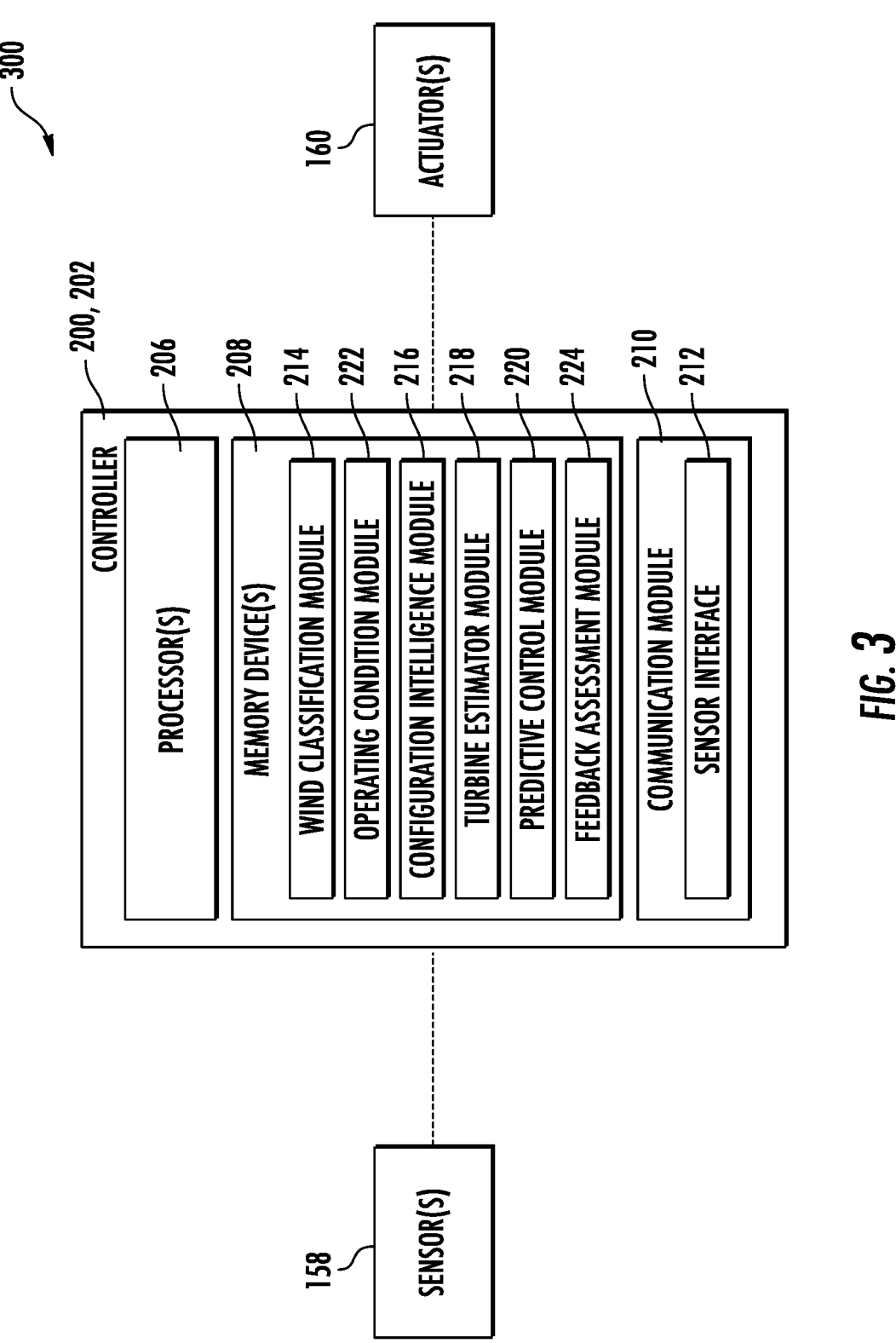
FIG. 3 illustrates a block diagram of one embodiment of a controller for use with the wind turbine according to the present disclosure.

As depicted in FIGS. 3 and 4, the system 300 may, in an embodiment, include a feedback assessment module 224. The feedback assessment module 224 may receive at least one feedback signal 350 from the turbine estimator module 218. The feedback signal(s) 350 may be indicative of an emulated operation of the wind turbine 100 in response to the aerodynamic state 302 and/or the current operating condition 340. In other words, the feedback signal(s) 350 may correspond to a digital representation of the physical wind turbine 100 when the current aerodynamic state 302 and/or the current operating condition 340 are encountered. As depicted at 352, The controller 200 may then modify, in an embodiment, at least one gain tuning 324 of the plurality of gain tunings 326 of the configuration intelligence module 216 based on the feedback signal(s) 350.

As depicted in FIG. 4, in an additional embodiment, the wind classification module 214 and/or the operating condition module 222 may receive the feedback signal(s) 350 from the turbine estimator module 218. In response to receiving the feedback signal(s) 350, the wind classification module 214 may modify the pluralities of wind descriptive parameters 404, and/or the designated portion 406 of the pluralities of wind descriptive parameters 404. Similarly, in an embodiment, the operating condition module 222 may modify the plurality of descriptive operating parameters 506 and/or the designated portion 508 of the plurality of descriptive operating parameters 506 based on the feedback signal(s) 350.

In an embodiment, the controller 200 may be configured to implement a plurality of parallel calculations to determine or generate the estimator configuration 306, the predictive control configuration 308, the control initial state 310, the predicted performance 312 of the wind turbine 100, and the setpoint(s) 316. For example, the controller 200 may be configured to leverage the computational advantages of advanced vector extension instructions. Accordingly, the processor(s) 206 of the controller 200 may have a multi-core architecture. The utilization of the multi-core architecture may facilitate executing the plurality of advanced vector extension instructions in parallel.

In an embodiment, the turbine estimator module 218 may compute a continuous data stream that is indicative of a structural state of the wind turbine 100 at any given instant. For example, the turbine estimator module 218 may, in an embodiment, be configured in accordance with the estimator configuration 306 and may receive the current operational data 304. In response thereto, the turbine estimator module 218 may emulate the structural state of the wind turbine 100. It should be appreciated that the structural state of the wind turbine 100 may correspond to the current state of the wind turbine 100 and may, therefore, establish the control initial state 310, from which the predictive control module 220 may project the performance of the wind turbine across the predictive interval 314. In an embodiment, the predictive interval may be less than 10 seconds (e.g., 8 seconds)

In an embodiment, the system 300 may utilize the predictive control module 220 to determine the predicted performance 312 of the wind turbine 100 over the predictive interval 314 and to generate the setpoint(s) 316 for the actuator(s) 160 based on the predicted performance 312. As such, the predictive control module may include a mathematical representation (e.g., model) of the system dynamics of the wind turbine 100 in a linearized form. Accordingly, the mathematical representation may be derived from first principles or other means (e.g. data driven models). As such, the predictive control module 220 may be configured to determine the outcomes of various high-fidelity simulation scenarios describing the operations of the wind turbine 100.

Starting from the control initial state 310, the predictive control module 220 may, in an embodiment, propagate the mathematical representation of the wind turbine 100 for future times (e.g., the predictive interval 314). For example, the predictive control module 220 may simulate/emulate the projected response of the wind turbine 100 to the current aerodynamic state 302 and/or current operating conditions 340. In other words, the predictive control module 220 may utilize model-based techniques to continuously emulate the operations of the wind turbine in response to the actual conditions, as reflected by the current operational data 304, affecting the wind turbine 100. It should be appreciated that the predictive control module 220 may be configured to digitally duplicate all aspects of the wind turbine 100.

It should also be appreciated that the predictive control module 220 may utilize the prediction capability of the mathematical representation/model to optimize the control actions (e.g., pitch and/or torque) across the predictive interval 314. The optimization may specify constraints to be respected during the predictive interval 314. The restraints may, for example, include blade loads, tower loads, pitch amplitude and rate constraints, torque amplitude and rate constraints, pitch travel, and/or other similar constraints. Additionally, the optimization may have a cost function configured to minimize penalties for deviation from performance target and penalties for control activities. The solution of the optimization may provide the optimal values of the setpoint(s) 316 across the predictive interval 314. The controller 200 may update the control initial state 310 and solve a new optimization for the now current time. As such, the optimization process is repeated continuously. In other words, the optimization problem is initialized and solved at the current time and a new optimization process is initiated in a receding horizon approach.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine, the wind turbine including a controller, the method comprising: determining, via a wind classification module of the controller, a current aerodynamic state of a wind resource based, at least in part, on a current operational data set of the wind turbine indicative of a current operation of the wind turbine; generating, via a configuration intelligence module of the controller, an estimator configuration for a turbine estimator module based, at least in part on the current aerodynamic state; emulating, via the turbine estimator module of the controller, an operation of the wind turbine so as to generate a control initial state for a predictive control module, wherein the control initial state comprises a modeled current operating state of a plurality of components of the wind turbine; generating, via the configuration intelligence module, a predictive control configuration for the predictive control module based, at least in part, on the current aerodynamic state; determining, via the predictive control module of the controller, a predicted performance of the wind turbine over a predictive interval based on the control initial state and the predictive control configuration: generating, via the predictive control module, a setpoint for at least one actuator of the wind turbine based on the predicted performance; and affecting an operating state of the wind turbine via the at least one actuator in accordance with the setpoint.

Clause 2. The method of clause 1, wherein the wind classification module comprises a first plurality of aeroelastic estimators, wherein each aeroelastic estimator is tuned to a different presumptive wind condition, and wherein determining the current aerodynamic state further comprises: generating, via the wind classification module, a plurality of wind descriptive parameters from each aeroelastic estimator based, at least in part, on the current operational data set; and determining, via the wind classification module, the current aerodynamic state based on a designated portion of the pluralities of wind descriptive parameters.

Clause 3. The method of any preceding clause, wherein determining the designated portion of the pluralities of wind descriptive parameters comprises: a) modelling, via the controller, a projected operational response of the wind turbine to one potential aerodynamic state of a plurality of potential aerodynamic states of the wind resource to generate a projected operational data set; b) generating, via the each aeroelastic estimator of the first plurality of aeroelastic estimators, a plurality of projected wind descriptive parameters based on the projected operational data set; c) determining a portion of the pluralities of projected wind descriptive parameters that replicates the one potential aerodynamic state; d) correlating the portion of the pluralities of projected wind descriptive parameters to the projected operational data set corresponding to the potential aerodynamic state; e) repeating steps a)-d) for a remainder of the plurality of potential aerodynamic states, wherein the plurality of potential aerodynamic states corresponds to an environmental operating envelope of the wind turbine; f) generating, via the controller, an operational-response signature data set comprising the projected operational data set at each potential aerodynamic state of the plurality of potential aerodynamic states and the portion of the pluralities of projected wind descriptive parameters that corresponds; and determining, via the wind classification module, the designated portion of the pluralities of wind descriptive parameters based on the operational-response signature data set, the pluralities of wind descriptive parameters, and the current operational data set.

Clause 4. The method of any preceding clause, wherein determining the designated portion of the pluralities of wind descriptive parameters further comprises: implementing at least one machine learning algorithm within the wind classification module to generate the operational-response signature data set; implementing the at least one machine learning algorithm to determine the designated portion of the pluralities of wind descriptive parameters corresponding to the current operational data set; and implementing the at least one machine learning algorithm to determine the current aerodynamic state based on the designated portion of the pluralities of wind descriptive parameters.

Clause 5. The method of any preceding clause, wherein each aeroelastic estimator of the first plurality of aeroelastic estimators comprises at least one aeroelastic model and at least one filtering algorithm, wherein the at least one aeroelastic model of each aeroelastic estimator is configured to model a behavior of the wind turbine as a multibody system of flexible structures, and wherein generating the pluralities of wind descriptive parameters further comprises: deriving, via the at least one aeroelastic model, a resultant aerodynamic state of the wind resource that develops the current operational data set in the presence of the presumptive wind condition corresponding to the tuning of the at least one aerodynamic model; and determining the plurality of wind descriptive parameters corresponding to the resultant aerodynamic state derived by the at least one aeroelastic model of each aeroelastic estimator of the first plurality of aeroelastic estimators.

Clause 6. The method of any preceding clause, wherein generating the estimator configuration and the predictive control configuration further comprises: selecting, via the configuration intelligence module, a gain tuning of a plurality of gain tunings based on the current aerodynamic state, wherein each gain tuning is configured to modify at least one of the estimator configuration and the predictive control configuration.

Clause 7. The method of any preceding clause, wherein generating the estimator configuration and the predictive control configuration further comprises: determining, via an operating condition module of the controller, a current operating condition of the wind turbine based, at least in part, on the current operational data set, wherein the operational data set further comprises a plurality of output signals from a sensor system of the wind turbine and at least one control signal from the controller: generating, via the configuration intelligence module of the controller, the estimator configuration for the turbine estimator module based, at least in part, on the current aerodynamic state and the current operating condition; and generating, via the configuration intelligence module, the predictive control configuration for the predictive control module based, at least in part, on the current aerodynamic state and the current operating condition.

Clause 8. The method of any preceding clause, wherein the operating condition module comprises a second plurality of aeroelastic estimators, wherein each aeroelastic estimator is tuned to a different presumptive fault condition of the wind turbine, and wherein determining the current operating condition further comprises: generating, via the operating condition module, a plurality of descriptive operating parameters from the second plurality of aeroelastic estimators based, at least in part, on the current operational data set; and determining, via the operating condition module, the current operating condition of the wind turbine based on a designated portion of the plurality of descriptive operating parameters.

Clause 9. The method of any preceding clause, wherein determining the designated portion of the plurality of descriptive operating parameters comprises: a) modelling, via the controller, a projected plurality of sensor outputs from the sensor system under one potential fault condition of a plurality of potential fault conditions for a projected operating condition; b) generating, via the second plurality of aeroelastic estimators, a plurality of projected descriptive operating parameters based on a projected operational data set corresponding to the projected operating condition; c) determining a portion of the plurality of projected descriptive operating parameters that replicates the projected plurality of sensor outputs; d) correlating the portion of the plurality of projected descriptive operating parameters to the projected plurality of sensor outputs to the one potential fault condition that corresponds; e) repeating steps a)-d) for a remainder of the plurality of potential fault conditions; implementing at least one machine learning algorithm within the operating condition module to generate a fault signature data set comprising the projected plurality of sensor outputs at each potential fault condition and the corresponding portion of the plurality of projected descriptive operating parameters; implementing the at least one machine learning algorithm to determine the designated portion of the plurality of descriptive operating parameters based on the fault signature data set and the current operational data set; and implementing the at least one machine learning algorithm to determine the current operating condition based on the designated portion of the plurality of descriptive operating parameters.

Clause 10. The method of any preceding clause, wherein each aeroelastic estimator of the second plurality of aeroelastic estimators comprises at least one aeroelastic model and at least one filtering algorithm, wherein the at least one aeroelastic model of each aeroelastic estimator is configured to model a behavior of the wind turbine as a multibody system of flexible structures.

Clause 11. The method of any preceding clause, wherein selecting the gain tuning of the plurality of gain tunings further comprises: selecting, via the configuration intelligence module, the gain tuning based on the current aerodynamic state and the current operating condition, wherein each gain tuning is configured to modify at least one of the estimator configuration and the predictive control configuration based on the current aerodynamic state of the wind resource and the current operating condition of the wind turbine.

Clause 12. The method of any preceding clause, wherein selecting the gain tuning of the plurality of gain tunings further comprises: determining a prioritization schedule for the plurality of gain tunings; and selecting, via the configuration intelligence module, the gain tuning in accordance with the prioritization schedule based on the current aerodynamic state and the current operating condition.

Clause 13. The method of any preceding clause, wherein selecting the gain tuning of the plurality of gain tunings further comprises: receiving, via a feedback assessment module of the controller, at least one feedback signal from the turbine estimator module, wherein the at least one feedback signal is indicative of an emulated operation of the wind turbine in response to the aerodynamic state and the current operating condition; and modifying, via the controller, at least one gain tuning of the plurality of gain tunings of the configuration intelligence module based on the at least one feedback signal.

Clause 14. The method of any preceding clause, generating the estimator configuration and the predictive control configuration further comprises: detecting, via the configuration intelligence module, a difference between the current aerodynamic state and an immediate-past aerodynamic state necessitating a gain transition; and implementing, via the configuration intelligence module, a transition algorithm corresponding to the current aerodynamic state to smoothly transition between an immediate-past gain tuning and the selected gain tuning corresponding to the current aerodynamic state.

Clause 15. The method of any preceding clause, wherein the estimator configuration comprises at least a process-noise gain and a sensor-noise gain.

Clause 16. The method of any preceding clause, wherein the predictive control configuration comprises at least gains corresponding to tracking weights, slack weights, and constraint limits.

Clause 17. The method of any preceding clause, further comprising: implementing, via the controller, a plurality of parallel calculations to determine or generate the estimator configuration, the predictive control configuration, the control initial state, the predicted performance of the wind turbine, and the setpoint.

Clause 18. The method of any preceding clause, wherein implementing the plurality of parallel calculations further comprises: executing a plurality of advanced vector extension instructions in parallel.

Clause 19. The method of any preceding clause, further comprising: receiving, via the wind classification module and the operating condition module, at least one feedback signal from the turbine estimator module, wherein the at least one feedback signal is indicative of an emulated operation of the wind turbine in response to the aerodynamic state and the current operating condition; and modifying, via the controller, at least one of the plurality of descriptive operating parameters, the designated portion of the plurality of descriptive operating parameters, the pluralities of wind descriptive parameters, or the designated portion of the pluralities of wind descriptive parameters based on the at least one feedback signal.

Clause 20. The method of any preceding clause, wherein emulating the operation of the wind turbine further comprises: computing, via the turbine estimator module, a continuous data stream indicative of a structural state of the wind turbine.

What is claimed is:

1. A method for controlling a wind turbine, the wind turbine including a controller, the method comprising:
   determining, via a wind classification module of the controller, a current aerodynamic state of a wind resource based, at least in part, on a current operational data set of the wind turbine indicative of a current operation of the wind turbine;
   generating, via a configuration intelligence module of the controller, an estimator configuration for a turbine estimator module based, at least in part on the current aerodynamic state;
   emulating, via the turbine estimator module of the controller, an operation of the wind turbine so as to generate a control initial state for a predictive control module, wherein the control initial state comprises a modeled current operating state of a plurality of components of the wind turbine;
   generating, via the configuration intelligence module, a predictive control configuration for the predictive control module based, at least in part, on the current aerodynamic state, wherein generating the estimator configuration and the predictive control configuration further comprises selecting, via the configuration intelligence module, a gain tuning of a plurality of gain tunings based on the current aerodynamic state, wherein each gain tuning is configured to modify at least one of the estimator configuration and the predictive control configuration;
   determining, via the predictive control module of the controller, a predicted performance of the wind turbine over a predictive interval based on the control initial state and the predictive control configuration;
   generating, via the predictive control module, a setpoint for at least one actuator of the wind turbine based on the predicted performance; and
   affecting an operating state of the wind turbine via the at least one actuator in accordance with the setpoint.

2. The method of claim 1, wherein the wind classification module comprises a first plurality of aeroelastic estimators, wherein each aeroelastic estimator is tuned to a different presumptive wind condition, and wherein determining the current aerodynamic state further comprises:
   generating, via the wind classification module, a plurality of wind descriptive parameters from each aeroelastic estimator based, at least in part, on the current operational data set; and
   determining, via the wind classification module, the current aerodynamic state based on a designated portion of the pluralities of wind descriptive parameters.

3. The method of claim 2, further comprising determining the designated portion of the pluralities of wind descriptive parameters by:
   a) modelling, via the controller, a projected operational response of the wind turbine to one potential aerodynamic state of a plurality of potential aerodynamic states of the wind resource to generate a projected operational data set;

b) generating, via the each aeroelastic estimator of the first plurality of aeroelastic estimators, a plurality of projected wind descriptive parameters based on the projected operational data set;

c) determining a portion of the pluralities of projected wind descriptive parameters that replicates the one potential aerodynamic state;

d) correlating the portion of the pluralities of projected wind descriptive parameters to the projected operational data set corresponding to the potential aerodynamic state;

e) repeating steps a)-d) for a remainder of the plurality of potential aerodynamic states, wherein the plurality of potential aerodynamic states corresponds to an environmental operating envelope of the wind turbine;

f) generating, via the controller, an operational-response signature data set comprising the projected operational data set at each potential aerodynamic state of the plurality of potential aerodynamic states and the portion of the pluralities of projected wind descriptive parameters that corresponds; and determining, via the wind classification module, the designated portion of the pluralities of wind descriptive parameters based on the operational-response signature data set, the pluralities of wind descriptive parameters, and the current operational data set.

4. The method of claim 3, wherein determining the designated portion of the pluralities of wind descriptive parameters further comprises:

implementing at least one machine learning algorithm within the wind classification module to generate the operational-response signature data set;

implementing the at least one machine learning algorithm to determine the designated portion of the pluralities of wind descriptive parameters corresponding to the current operational data set; and implementing the at least one machine learning algorithm to determine the current aerodynamic state based on the designated portion of the pluralities of wind descriptive parameters.

5. The method of claim 2, wherein each aeroelastic estimator of the first plurality of aeroelastic estimators comprises at least one aeroelastic model and at least one filtering algorithm, wherein the at least one aeroelastic model of each aeroelastic estimator is configured to model a behavior of the wind turbine as a multibody system of flexible structures, and wherein generating the pluralities of wind descriptive parameters further comprises:

deriving, via the at least one aeroelastic model, a resultant aerodynamic state of the wind resource that develops the current operational data set in the presence of the presumptive wind condition corresponding to the tuning of the at least one aerodynamic model; and determining the plurality of wind descriptive parameters corresponding to the resultant aerodynamic state derived by the at least one aeroelastic model of each aeroelastic estimator of the first plurality of aeroelastic estimators.

6. The method of claim 1, wherein generating the estimator configuration and the predictive control configuration further comprises:

determining, via an operating condition module of the controller, a current operating condition of the wind turbine based, at least in part, on the current operational data set, wherein the operational data set further comprises a plurality of output signals from a sensor system of the wind turbine and at least one control signal from the controller;

generating, via the configuration intelligence module of the controller, the estimator configuration for the turbine estimator module based, at least in part, on the current aerodynamic state and the current operating condition; and generating, via the configuration intelligence module, the predictive control configuration for the predictive control module based, at least in part, on the current aerodynamic state and the current operating condition.

7. The method of claim 6, wherein the operating condition module comprises a second plurality of aeroelastic estimators, wherein each aeroelastic estimator is tuned to a different presumptive fault condition of the wind turbine, and wherein determining the current operating condition further comprises:

generating, via the operating condition module, a plurality of descriptive operating parameters from the second plurality of aeroelastic estimators based, at least in part, on the current operational data set; and determining, via the operating condition module, the current operating condition of the wind turbine based on a designated portion of the plurality of descriptive operating parameters.

8. The method of claim 7, wherein determining the designated portion of the plurality of descriptive operating parameters comprises:

a) modelling, via the controller, a projected plurality of sensor outputs from the sensor system under one potential fault condition of a plurality of potential fault conditions for a projected operating condition;

b) generating, via the second plurality of aeroelastic estimators, a plurality of projected descriptive operating parameters based on a projected operational data set corresponding to the projected operating condition;

c) determining a portion of the plurality of projected descriptive operating parameters that replicates the projected plurality of sensor outputs;

d) correlating the portion of the plurality of projected descriptive operating parameters to the projected plurality of sensor outputs to the one potential fault condition that corresponds;

e) repeating steps a)-d) for a remainder of the plurality of potential fault conditions; implementing at least one machine learning algorithm within the operating condition module to generate a fault signature data set comprising the projected plurality of sensor outputs at each potential fault condition and the corresponding portion of the plurality of projected descriptive operating parameters;

implementing the at least one machine learning algorithm to determine the designated portion of the plurality of descriptive operating parameters based on the fault signature data set and the current operational data set; and implementing the at least one machine learning algorithm to determine the current operating condition based on the designated portion of the plurality of descriptive operating parameters.

9. The method of claim 7, wherein each aeroelastic estimator of the second plurality of aeroelastic estimators comprises at least one aeroelastic model and at least one filtering algorithm, wherein the at least one aeroelastic model of each aeroelastic estimator is configured to model a behavior of the wind turbine as a multibody system of flexible structures.

10. The method of claim 7, wherein selecting the gain tuning of the plurality of gain tunings further comprises:

selecting, via the configuration intelligence module, the gain tuning based on the current aerodynamic state and the current operating condition, wherein each gain tuning is configured to modify at least one of the estimator configuration and the predictive control configuration based on the current aerodynamic state of the wind resource and the current operating condition of the wind turbine.

11. The method of claim 10, wherein selecting the gain tuning of the plurality of gain tunings further comprises:

determining a prioritization schedule for the plurality of gain tunings; and selecting, via the configuration intelligence module, the gain tuning in accordance with the prioritization schedule based on the current aerodynamic state and the current operating condition.

12. The method of claim 11, wherein selecting the gain tuning of the plurality of gain tunings further comprises:

receiving, via a feedback assessment module of the controller, at least one feedback signal from the turbine estimator module, wherein the at least one feedback signal is indicative of an emulated operation of the wind turbine in response to the aerodynamic state and the current operating condition; and modifying, via the controller, at least one gain tuning of the plurality of gain tunings of the configuration intelligence module based on the at least one feedback signal.

13. The method of claim 7, further comprising:

receiving, via the wind classification module and the operating condition module, at least one feedback signal from the turbine estimator module, wherein the at least one feedback signal is indicative of an emulated operation of the wind turbine in response to the aerodynamic state and the current operating condition; and modifying, via the controller, at least one of the plurality of descriptive operating parameters, the designated portion of the plurality of descriptive operating parameters, the pluralities of wind descriptive parameters, or the designated portion of the pluralities of wind descriptive parameters based on the at least one feedback signal.

14. The method of claim 7, wherein emulating the operation of the wind turbine further comprises:

computing, via the turbine estimator module, a continuous data stream indicative of a structural state of the wind turbine.

15. The method of claim 1, generating the estimator configuration and the predictive control configuration further comprises:

detecting, via the configuration intelligence module, a difference between the current aerodynamic state and an immediate-past aerodynamic state necessitating a gain transition; and implementing, via the configuration intelligence module, a transition algorithm corresponding to the current aerodynamic state to smoothly transition between an immediate-past gain tuning and the selected gain tuning corresponding to the current aerodynamic state.

16. The method of claim 1, wherein the estimator configuration comprises at least a process-noise gain and a sensor-noise gain.

17. The method of claim 1, wherein the predictive control configuration comprises at least gains corresponding to tracking weights, slack weights, and constraint limits.

18. The method of claim 1, further comprising:

implementing, via the controller, a plurality of parallel calculations to determine or generate the estimator configuration, the predictive control configuration, the control initial state, the predicted performance of the wind turbine, and the setpoint.

19. The method of claim 18, wherein implementing the plurality of parallel calculations further comprises:

executing a plurality of advanced vector extension instructions in parallel.

* * * * *